United States Patent
Sasaki

(10) Patent No.: US 8,462,217 B2
(45) Date of Patent: Jun. 11, 2013

(54) IMAGE PICKUP DEVICE, FLASH IMAGE GENERATING METHOD, AND COMPUTER-READABLE MEMORY MEDIUM

(75) Inventor: Masaaki Sasaki, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 752 days.

(21) Appl. No.: 12/638,021

(22) Filed: Dec. 15, 2009

(65) Prior Publication Data

US 2010/0157085 A1   Jun. 24, 2010

(30) Foreign Application Priority Data

Dec. 18, 2008 (JP) ................................. 2008-322960
Jun. 16, 2009 (JP) ................................. 2009-143736

(51) Int. Cl.
*H04N 5/228* (2006.01)
(52) U.S. Cl.
USPC ................. 348/208.4; 348/208.1; 348/208.14
(58) Field of Classification Search
USPC ............... 348/207.99, 208.6, 208.14, 208.13, 348/208.2, 208.3, 208.1, 208.5, 208.4; 382/255, 382/294
See application file for complete search history.

(56) References Cited

U.S. PATENT DOCUMENTS

| 2005/0213840 A1* | 9/2005 | Chen | 382/260 |
| 2007/0133901 A1* | 6/2007 | Aiso | 382/294 |

FOREIGN PATENT DOCUMENTS

| JP | 9-102910 A | | 4/1997 |
| JP | 10-083033 | * | 3/1998 |
| JP | 10-083033 A | | 3/1998 |
| JP | 3793258 B2 | | 4/2006 |

OTHER PUBLICATIONS

Chinese Office Action dated Sep. 21, 2011 (and English translation thereof) in counterpart Chinese Application No. 200911000262.3.
Japanese Office Action dated Jan. 4, 2011 (and English translation thereof) in counterpart Japanese Application No. 2009-143736.
Complete English translation of a Chinese Office Action dated Sep. 21, 2011 issued in counterpart Chinese Application No. 200911000262.3.

* cited by examiner

*Primary Examiner* — Lin Ye
*Assistant Examiner* — Euel Cowan
(74) *Attorney, Agent, or Firm* — Holtz, Holtz, Goodman & Chick, P.C.

(57) ABSTRACT

When a displacement between a reference frame of a plurality of images acquired by continuous image pickup and a target frame is less than a first threshold indicating that such a frame is not likely to be affected by occlusion, smoothing is performed on an object area through a morphological operation with a normal process amount. Conversely, when a displacement between the reference frame of the plurality of images acquired by continuous image pickup and a target frame is larger than or equal to the first threshold, smoothing is performed with the process amount of morphological operation being increased than a normal process amount.

8 Claims, 24 Drawing Sheets

FIG. 7

| IMAGE PICKUP FRAME NUMBER | EFFECTIVE FRAME (FRAME LEVEL) | EFFECTIVE FRAME (OBJECT LEVEL) | DISPLACEMENT VF (RELATIVE TO FRAME REFERENCE FRAME N) | ... | EFFECTIVE FRAME NUMBER |
|---|---|---|---|---|---|
| 1 | OK | OK | --- | ... | 1 |
| 2 | OK | NG | $VF < th1$ | ... | --- |
| 3 | NG | NG | $th2 \leq VF$ | ... | --- |
| 4 | OK | NG | $th1 \leq VF < th2$ | ... | --- |
| 5 | OK | OK | $VF < th1$ | ... | 2 |
| 6 | OK | NG | $th1 \leq VF < th2$ | ... | --- |
| ... | ... | ... | ... | ... | ... |
| p | OK | OK | $VF < th1$ | ... | p' |

FRAME INFORMATION TABLE

FLASH IMAGE

IMAGE PICKUP DEVICE, FLASH IMAGE GENERATING METHOD, AND COMPUTER-READABLE MEMORY MEDIUM

CROSS-REFERENCE TO RELATED APPLICATIONS

This application is based upon and claims the benefit of priority from prior Japanese Patent Applications No. 2008-322960, filed on Dec. 18, 2008, and No. 2009-143736, filed on Jun. 16, 2009, and including specifications, claims, drawings and summaries, the entire contents of both of which are incorporated herein by reference.

FIELD

The present invention relates to an image pickup device suitable for generating a flash image, a flash image generating method, and a computer-readable memory medium.

BACKGROUND

There are known flash images like one shown in FIG. 22 that images of a moving object are picked up by a fixed camera and how the object moves is expressed in one image (picture). According to film cameras, strobe flashing is carried out plural times relative to a moving object during a long-time exposure to generate such a flash image. In recent days that digital cameras become widespread, flash images can be generated through an image processing by a computer in cameras.

In generating a flash image, images of a moving object are picked up by continuous image-pickup with the angle of view of a digital camera and a direction thereof being set at constant. When images are picked up with the digital camera being held in hands, because the digital camera slightly moves, a change in the angle of view among continuously picked-up frame images may be caused. In a case in which the depth of a background of an object (a moving object) is large, when the displacement between the frame images is large, because of occlusion, a difference in a background area is created which must be originally stay at the same place among the frame images. If such a difference is large, the background part may be falsely recognized as the moving object. As a result, the background part is duplicated (duplicatingly synthesized) over a generated flash image.

SUMMARY

The present invention has been made in view of the foregoing circumstance, and it is an object of the present invention to provide an image pickup device which can generate a better flash image, a flash image generating method, and a computer-readable recording medium.

To achieve the object, an image pickup device according to the first aspect of the present invention comprises: an image pickup unit which generates a plurality of continuously picked-up images by image pickup; an object extracting unit which extracts a plurality of images each representing a moving object part from individual picked-up images generated by the image pickup unit; a background image generating unit which generates a background image from the plurality of picked-up images generated by the image pickup unit; a flash image generating unit which synthesizes the background image generated by the background image generating unit with the plurality of images each representing the object part extracted by the object extracting unit to generate a flash image; a displacement detecting unit which detects a displacement between predetermined images among the plurality of picked-up images; and an image smoothing unit which performs smoothing on the image by a process amount in accordance with the displacement detected by the displacement detecting unit.

To achieve the object, a flash image generating method according to the second aspect of the present invention which generates a flash image from a plurality of continuous images in which images of a moving object are picked up using a device which executes an image processing, the method comprises; an object extracting step of causing the device to extract a plurality of images each representing the moving object part from the plurality of continuous images; a background image generating step of causing the device to generate a background image from the plurality of continuous images; a displacement detecting step of causing the device to detect a displacement between predetermined images among the plurality of continuous images; an image smoothing step of causing the device to perform smoothing on an image extracted in the object extracting step by a process amount in accordance with the displacement detected in the displacement detecting step; and a flash image generating step of causing the device to synthesize the background image generated in the background image generating step with the plurality of images each representing the object part extracted in the object extracting step to generate a flash image.

To achieve the object, a computer-readable memory medium according to the third aspect of the present invention stores a program which allows a computer to realize: a function of acquiring a plurality of continuous images in which images of a moving object are picked up; a function of extracting a plurality of images each representing a moving object part from the plurality of continuous images; a function of generating a background image from the plurality of continuous images; a function of detecting a displacement between predetermined images among the plurality of continuous images; a function of performing smoothing on the extracted image by a process amount in accordance with the detected displacement; and a function of synthesizing the generated background image with the plurality of images each representing the object part to generate a flash image.

BRIEF DESCRIPTION OF THE DRAWINGS

A more complete understanding of this application can be obtained when the following detailed description is considered in conjunction with the following drawings, in which:

FIG. 7 is a drawing showing an example of information stored in a "frame information table" created in the "alignment process" in FIG. 6;

DETAILED DESCRIPTION

First Embodiment

An explanation will be given of an embodiment of the present invention with reference to accompanying drawings. In a first embodiment, an explanation will be given of an example case in which the present invention is embodied using a digital still camera (hereinafter, digital camera). A digital camera 1 of the embodiment has functions that general digital still cameras have, and such functions include at least a so-called continuous image-pickup function. The continuous image-pickup function in the embodiment means a function of acquiring plural continuous picked-up images through one shutter button operation.

The digital camera 1 of the embodiment also has a flash image generating function of generating a flash image (multi-stroboscopic image) from picked-up images acquired by the continuous image-pickup function as the present invention is applied. Note that a "flash image" means an image that a movement of a moving object is described in one image. In order to generate a flash image using the digital camera 1 of the embodiment, images of a moving object are picked up by the continuous image-pickup function, and in this case, the direction of the digital camera 1 and the angle of view thereof are set constant to pick up an image.

Figure 1:
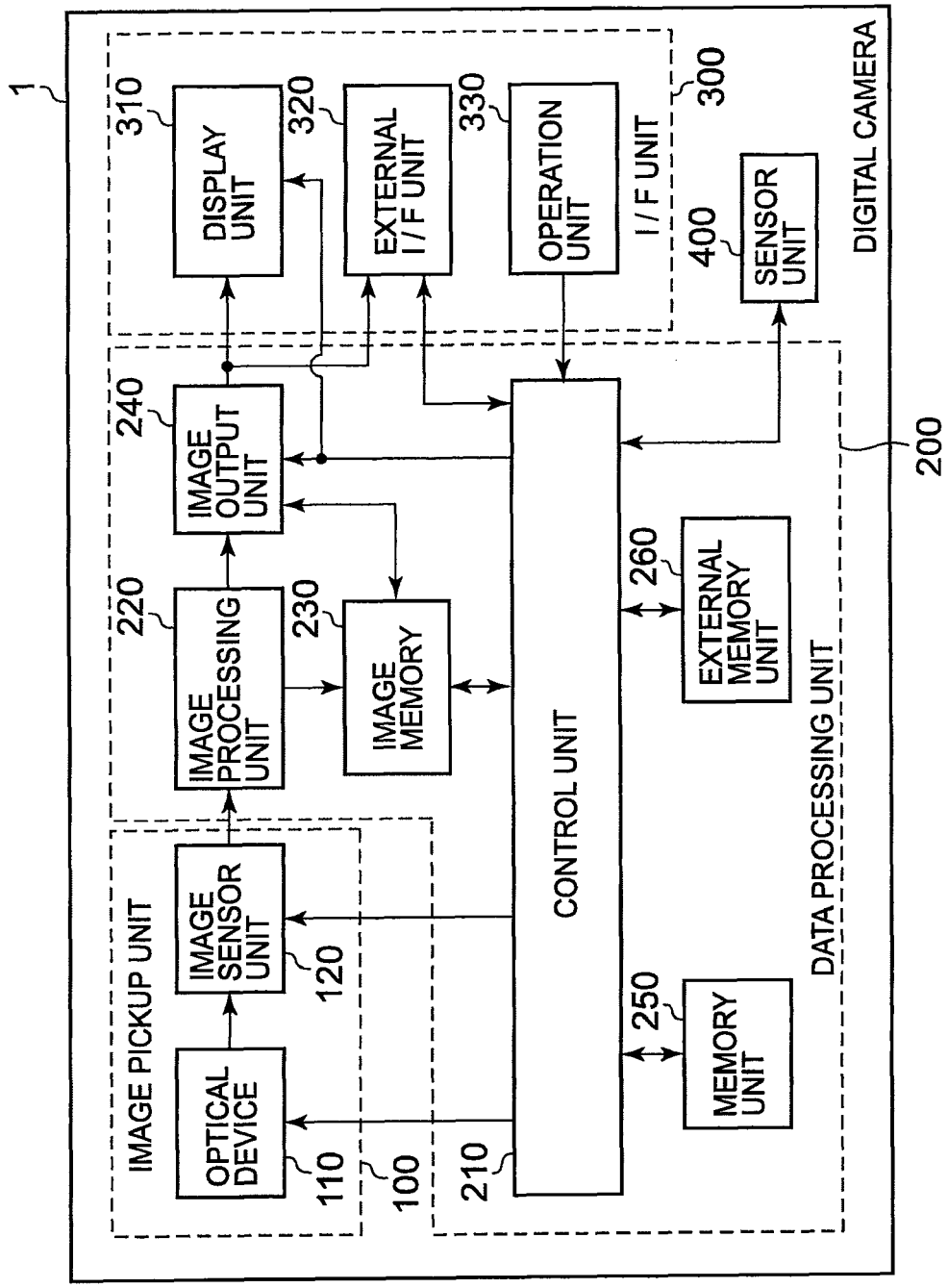
FIG. 1 is a block diagram showing a configuration of a digital camera according to an embodiment of the present invention.

FIG. 1 is a block diagram showing a configuration of the digital camera 1 according to the embodiment. As shown in FIG. 1, the digital camera 1 of the embodiment comprises an image pickup unit 100, a data processing unit 200, an interface (I/F) unit 300, a sensor unit 400, and the like.

The image pickup unit 100 is a part which executes an image pickup operation of the digital camera 1. As shown in FIG. 1, the image pickup unit 100 comprises an optical device 110, an image sensor unit 120, and the like.

The optical device 110 includes, for example, a lens, a diaphragm mechanism, and a shutter mechanism. The optical device 110 executes an optical operation with respect to image pickup. That is, as the optical device 110 operates, incident light is collected, and optical factors relating to an angle of view, an exposure, or the like, such as a focal point distance, an aperture, and a shutter are adjusted. The shutter mechanism in the optical device 110 is a so-called mechanical shutter. When a shutter operation is carried out through merely an operation of the image sensor, the optical device 110 may not need the shutter mechanism. The optical device 110 operates under a control of the control unit 210 to be described later.

The image sensor unit 120 comprises an image sensor, such as a CCD (Charge Coupled Device) or a CMOS (Complementally Metal Oxide Semiconductor) which generates an electrical signal in accordance with incident light collected by the optical device 110. As the image sensor unit 120 performs photoelectric conversion, an electric signal in accordance with reception of light is generated and is output to the data processing unit 200.

The data processing unit 200 processes an electric signal generated through an image pickup operation of the image pickup unit 100, generates digital data representing a picked-up image, and executes an image processing on the picked-up image. As shown in FIG. 1, the data processing unit 200 comprises the control unit 210, an image processing unit 220, an image memory 230, an image output unit 240, a memory unit 250, an external memory unit 260, and the like.

The control unit 210 comprises, for example, a processor like a CPU (Central Processing Unit), and a main memory device like a RAM (Random Access Memory). As the control unit 210 runs a program stored in the memory unit 250 to be described later, the control unit 210 controls each unit of the digital camera 1. In the embodiment, as a predetermined program is run, the control unit 210 realizes various functions relating to individual processes to be described later.

The image processing unit 220 comprises, for example, an ADC (Analog-Digital Converter), a buffer memory, and a processor for an image processing (i.e., a so-called image processing engine). The image processing unit 220 generates digital data representing a picked-up image based on an electric signal generated by the image pickup unit 100.

That is, the ADC converts an analog electric signal output by the image sensor unit 120 into a digital signal, such digital signal is successively stored in the buffer memory, and the image processing engine performs a so-called development process on the buffered digital data, thus adjusting an image quality and compressing data.

The image memory 230 comprises a memory device, such as a RAM or a flash memory. The image memory 230 temporarily stores picked-up image data generated by the image processing unit 220 and image data processed by the control unit 210.

The image output unit 240 comprises a circuit generating an RGB signal. The image output unit 240 converts image data stored in the image memory 230 into an RGB signal, and outputs such an RGB signal to a display screen (e.g., a display unit 310 to be described later).

The memory unit 250 comprises a memory device, such as a ROM (Read Only Memory) or a flash memory. The memory unit 250 stores program and data necessary for operating the digital camera 1. In the embodiment, the memory unit 250 stores an operation program executed by the control unit 210, parameters and arithmetic expressions necessary for executing processes.

The external memory unit 260 comprises a memory device removable from the digital camera 1 like a memory card. The external memory unit 260 stores image data picked up by the digital camera 1.

The interface unit 300 functions as an interface between the digital camera 1 and a user or an external device. As shown in FIG. 1, the interface unit 300 comprises the display unit 310, an external interface (I/F) unit 320, an operation unit 330, and the like.

The display unit 310 comprises, for example, a liquid crystal display device. The display unit 310 displays and outputs various screens necessary for operating the digital camera 1, a live-view image at the time of image pickup, a picked-up image, and the like. In the embodiment, a picked-up image or the like is displayed and output based on an image signal (an RGB signal) from the image output unit 240.

The external interface unit 320 comprises, for example, a USB (Universal Serial Bus) connector, and a video output terminal. The external interface unit 320 outputs image data to an external computer device, and outputs and displays a picked-up image on an external monitor device.

The operation unit 330 comprises various buttons provided at an external face of the digital camera 1. The operation unit 330 generates an input signal corresponding to an operation by the user of the digital camera 1, and inputs such a signal into the control unit 210. The buttons configuring the operation unit 330 include, for example, a shutter button for instructing a shutter operation, a mode button for specifying an operation mode of the digital camera 1, a cross key and a function button for various setting, and the like.

The sensor unit 400 is provided in the digital camera 1 if the digital camera 1 has a camera-shake compensation function. The sensor unit 400 detects a movement of the digital camera 1. The sensor unit 400 comprises, for example, a gyro sensor. The sensor unit 400 detects a movement of the digital camera 1 caused by depression of the shutter button for example, and inputs a detection value to the control unit 210.

In the embodiment, as the control unit 210 runs the operation program stored in the memory unit 250, individual processes to be described later are executed. Functions realized by the control unit 210 in this case will be explained with reference to FIG. 2.

Figure 2:
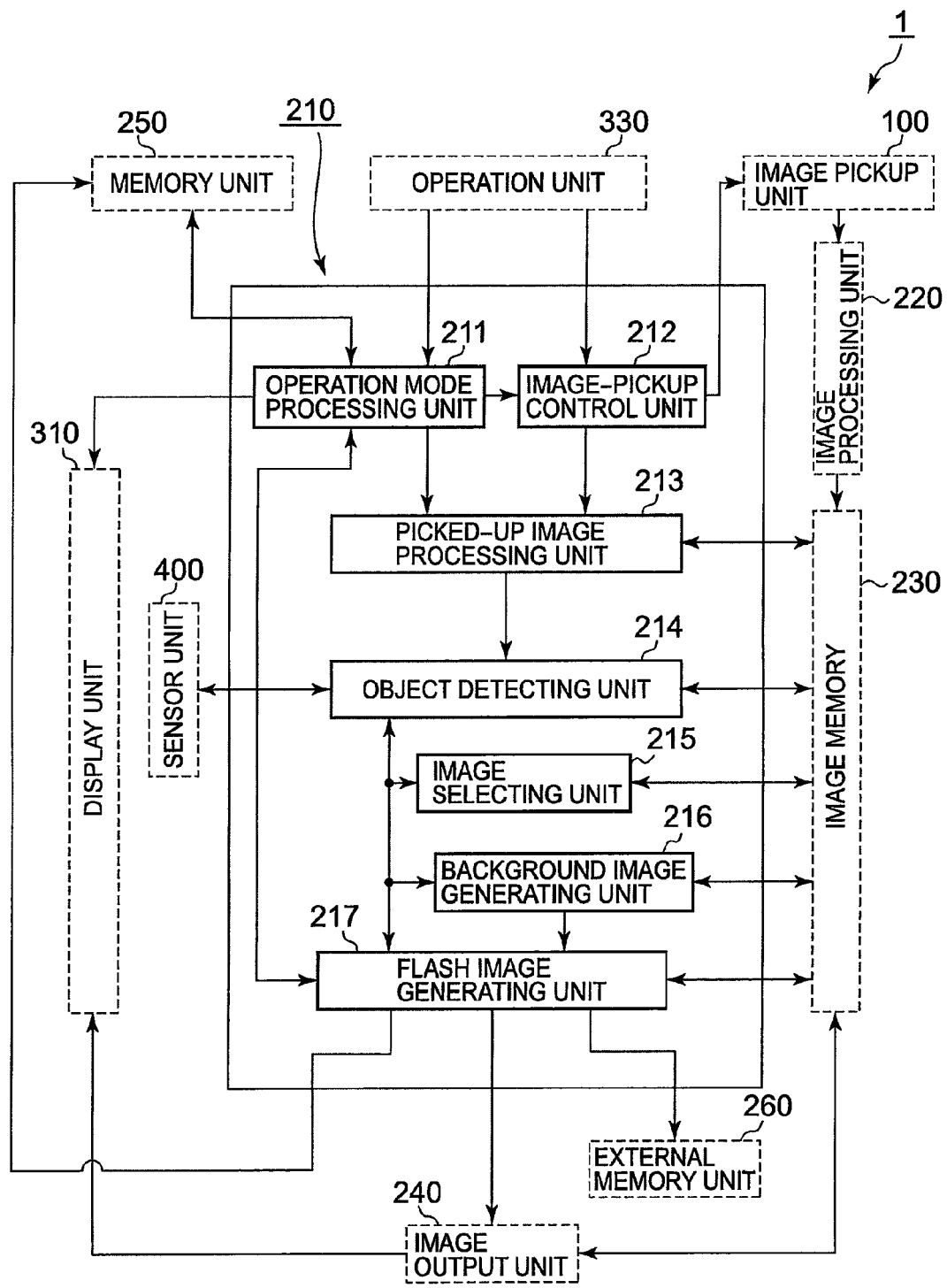
FIG. 2 is a function block diagram showing functions realized by a control unit in FIG. 1.

FIG. 2 is a function block diagram showing functions realized by the control unit 210. FIG. 2 shows a function configuration necessary for realizing a function of generating a flash image from images picked up by the continuous image-pickup function. In this case, as shown in FIG. 2, the control unit 210 functions as a operation mode processing unit 211, an image-pickup control unit 212, a picked-up image processing unit 213, an object detecting unit 214, an image selecting unit 215, a background image generating unit 216, a flash image generating unit 217, and the like.

The operation mode processing unit 211 displays a screen necessary for causing the user to specify various operation modes of the digital camera 1 together with the display unit 310, and displays a setting screen for each operation mode. The operation mode processing unit 211 recognizes an operation mode specified by the user together with the operation unit 330, reads out a program or an arithmetic expression necessary for executing such an operation mode from the memory unit 250 or the like, and loads the read-out program or expression in the main memory device (memory).

In the embodiment, it is assumed that an operation mode relating to a flash image generating function (flash image generating mode) is selected by a user. Each function configuration of the control unit 210 to be described below is a function configuration realized as the operation mode processing unit 211 runs a program loaded in accordance with selection of the flash image generating mode.

The image-pickup control unit 212 executes an image pickup operation of the digital camera 1 by controlling the image pickup unit 100. According to the flash image generating function of the embodiment, because a flash image is generated from picked-up images acquired by the continuous image-pickup function of the digital camera 1, the image-pickup control unit 212 of the embodiment controls the image pickup unit 100 to perform a continuous image-pickup operation. In this case, while the shutter button of the operation unit 330 is being pressed, the image pickup unit 100 continuously performs image pickup operations. A picked-up image (continuously-picked-up image) acquired through the continuous image-pickup operation under the control of the image-pickup control unit 212 is processed by the image processing unit 220, and is sequentially stored in the image memory 230. In this case, a frame number is allocated to each continuously-picked-up image stored in the image memory in the order of image pickup.

The picked-up image processing unit 213 converts and processes a continuously-picked-up image stored in the image memory 230 in a format according to a process relating to generation of a flash image, and executes various processes using a picked-up image. In the embodiment, the picked-up image processing unit 213 aligns continuously-picked-up images, and converts a picked-up image into one-dimensional data in order to enable high-speed extraction of an object area. Data converted by the picked-up image processing unit 213 is stored in, for example, the main memory device (memory) of the control unit 210. Note that "one-dimensional data" represents information like a pixel value configuring image data with a value projected on one coordinate axis. For example, a projected value can be calculated by combining pixel values, such as an RGB, and a YUB, in a direction perpendicular to the foregoing one coordinate axis. In the embodiment, projection data, which is acquired by projecting image data in a predetermined direction, forms one-dimensional data. The direction in which image data is projected in this case is set based on a moving direction of a target object (this will be described in detail later).

The object detecting unit 214 detects a part (area) of an object in each picked-up image by comparing one-dimensional data among individual picked-up images. In this case, the object detecting unit 214 detects positional information (coordinate information) of a detected object part. Moreover, the object detecting unit 214 extracts an object part from a picked-up image (continuously-picked-up image) stored in the image memory 230 regarding an image selected by the image selecting unit 215.

The image selecting unit 215 selects picked-up images that an object part does not overlap one another based on positional information of the object part detected by the object detecting unit 214, thus selecting an appropriate image (frame) for generation of a flash image among the continuously-picked-up images.

The background image generating unit 216 generates a background image from a picked-up image selected by the image selecting unit 215. The background image generating unit 216 acquires pixel values at the same coordinate for all of the selected picked-up images, sets a central value or the like of the acquired pixel values as a pixel value of the coordinate, thereby generating a background image in which an object is excluded.

The flash image generating unit 217 synthesizes an image of the object part extracted by the object detecting unit 214 from the selected picked-up image with a background image generated by the background image generating unit 216, thereby generating a flash image that a moving object appears at plural portions in one background image without overlapping one another.

The above-explained functions are ones realized by the control unit 210. Note that in the embodiment, each of the above-explained functions are realized through a logical process executed by the control unit 210 which runs a program, but those functions may be realized by a hardware resource like an ASIC (Application Specific Integrated Circuit). In this case, a part of or all of functions relating to image processing among the functions shown in FIG. 2 may be realized by the image processing unit 220.

The above-explained configuration of the digital camera 1 is requisite for realizing the present invention, and it is presumed that the digital camera is provided with a configuration used for a basic function of the digital camera and various additional functions thereof as needed.

An explanation will be given of an operation of the digital camera 1 having the foregoing configuration. An explanation will be given of a "flash image generating process" executed by the digital camera 1 when the flash image generating mode is selected with reference to the flowchart of FIG. 3. The flash image generating process starts when the flash image generating mode is selected as the user of the digital camera 1 operates the operation unit 330. In this case, the operation mode processing unit 211 loads a program for the flash image generating mode from the memory unit 250, and each function configuration shown in FIG. 2 executes following processes.

Figure 4A:
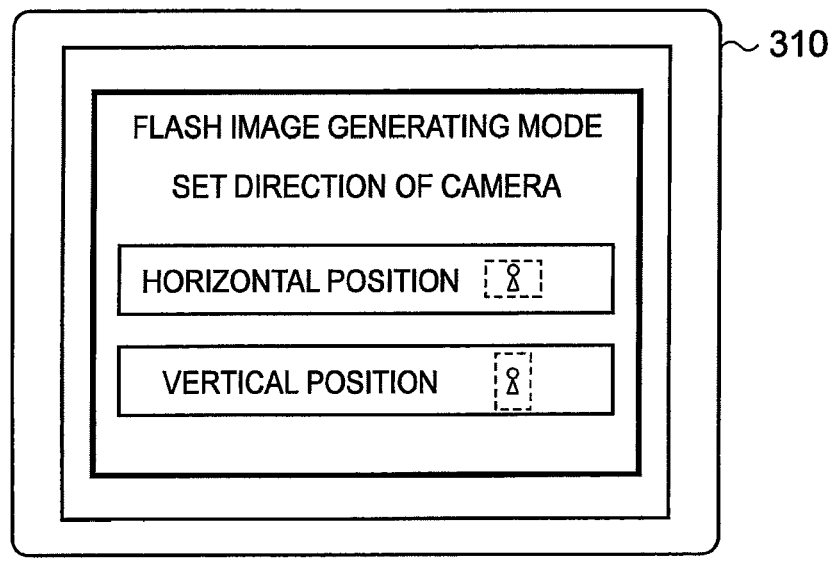
FIG. 4A is a drawing for explaining a display example of a setting screen displayed in the "flash image generating process" in FIG. 3, and showing a display example of the setting screen for specifying a direction of the camera.
Figure 4B:
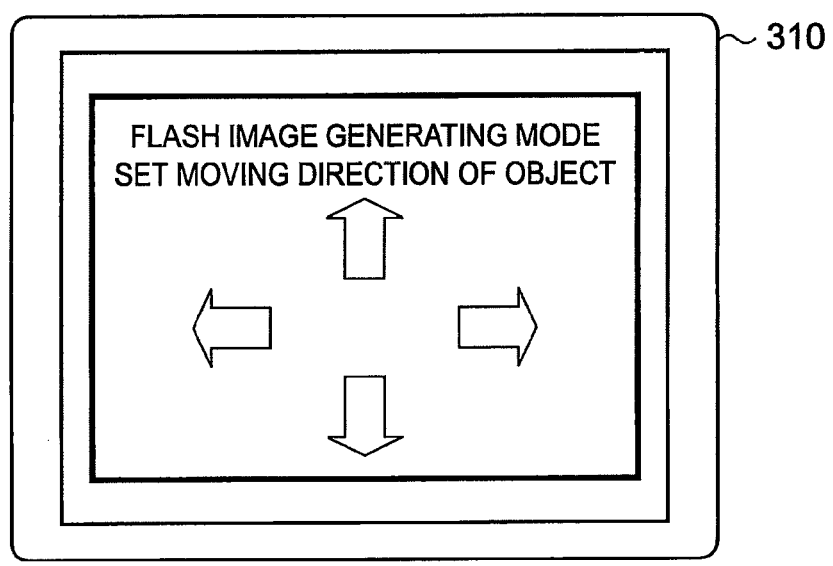
FIG. 4B is a drawing for explaining a display example of a setting screen displayed in the "flash image generating process" in FIG. 3, and showing a display example of the setting screen for specifying a moving direction of an object.

As the process starts, the operation mode processing unit 211 displays a setting screen for a setting necessary for executing the flash image generating mode on the display unit 310 (step S101). FIGS. 4A, 4B show examples of the setting screen displayed in this step.

First, a setting screen for setting a direction of the camera (horizontal direction and vertical direction) shown in FIG. 4A is displayed. This setting screen is for causing the user to select whether the digital camera 1 is in a horizontal position or a vertical position at the time of picking up continuously-picked-up images which will be a flash image. The user of the digital camera 1 operates the operation unit 330, and specifies the direction of the camera at the time of continuous image-pickup. Note that if the digital camera 1 is provided with a vertical position detecting function realized by, for example, an acceleration sensor, a detection result can be used for such setting, so that it is not necessary for the user to specify the position through the setting screen.

As the direction of the camera is specified, the operation mode processing unit 211 displays a setting screen for setting a moving direction of an object as shown in FIG. 4B on the display unit 310. That is, in the flash image generating mode, images of a moving object are picked up, so that the moving direction thereof is set at this time. As shown in FIG. 4B, in the setting screen for setting the moving direction of the object, for example, arrows indicating four directions are displayed. The moving direction of the object subjected to image pickup is selected as the user operates the cross key or the like of the operation unit 330.

The operation mode processing unit 211 records the direction of the camera and the moving direction of the object set in this fashion in the main memory device (memory) or the like of the control unit 210, thus carrying out the setting for the flash image generating mode (step S102).

Figure 5A:
FIG. 5A is a drawing for explaining a picked-up image according to the embodiment of the present invention, and exemplifying a scene of continuous image-pickup necessary for generating a flash image.

FIG. 5A exemplifies a relationship between the digital camera 1 and the object when image pickup is carried out in the flash image generating mode. In this case, it is assumed that images of an object MV moving from left to right are picked up. Image pickup is carried out with the direction of the digital camera 1 and the angle of view thereof being set at constant. In the example case shown in FIG. 5A, the contents of setting in the step S102 are that "the direction of the camera is horizontal", and "the moving direction of the object is to right". That is, the setting is made for the case in which the object is moving in the horizontal direction.

As explained above, images are picked up by continuous image-pickup in the flash image generating mode, the user of the digital camera 1 makes the foregoing setting, and then operates the shutter button of the operation unit 330 to start image pickup. Accordingly, the operation mode processing unit 211 instructs the image-pickup control unit 212 to perform continuous image-pickup when the flash image generating mode is specified.

As the user (photographer) of the digital camera 1 operates (presses) the shutter button (operation unit 330), the operation unit 330 inputs an input signal according to the user operation into the control unit 210. Accordingly, the image-pickup control unit 212 determines that the shutter button is operated (step S103: YES), and controls the image pickup unit 100 to perform continuous image-pickup (step S104). The continuous image-pickup operation is carried out while the user is pressing the shutter button (step S105: NO).

As the shutter button operation is finished (step S105: YES), the image-pickup control unit 212 instructs the image pickup unit 100 to terminate the image pickup operation. Accordingly, the continuous image-pickup operation is terminated, and images (continuously-picked-up images) acquired by continuous image-pickup are sequentially processed by the image processing unit 220, and stored in the image memory 230 (step S106).

Figure 5B:
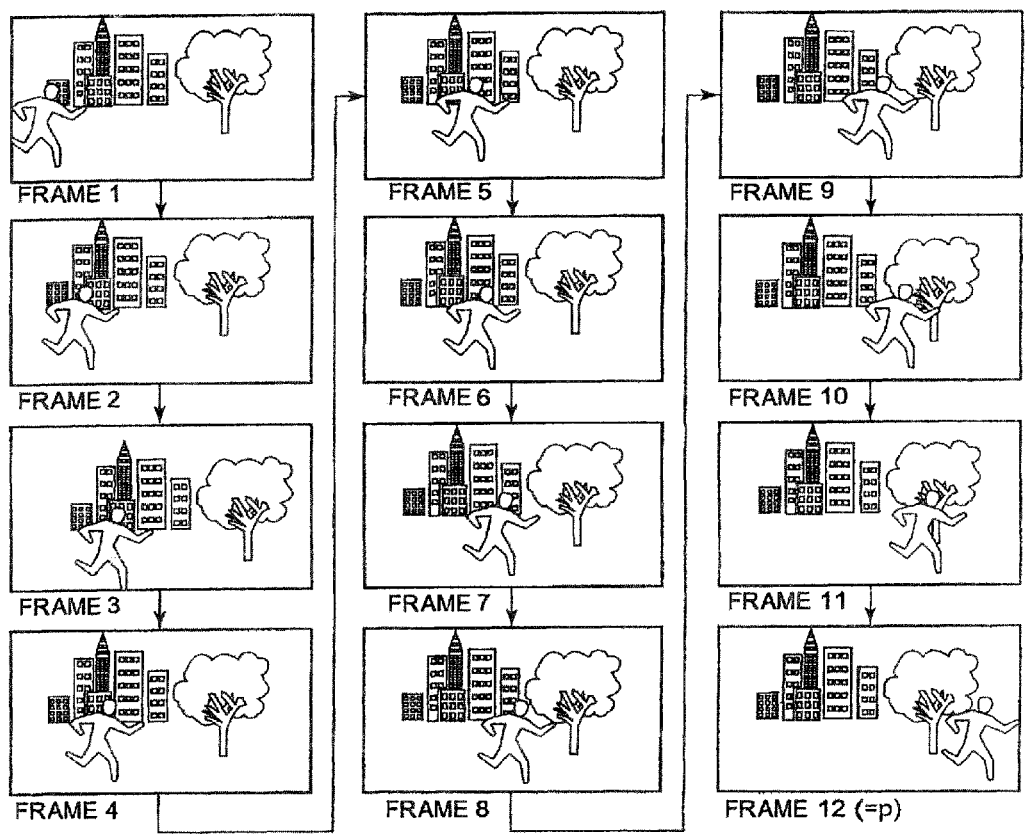
FIG. 5B is a drawing for explaining a picked-up image according to the embodiment of the present invention, and showing an example of a picked-up image (continuously-picked-up image) acquired by continuous image-pickup in FIG. 5A.

FIG. 5B shows examples of continuously-picked-up images acquired when a scene exemplified in FIG. 5A is continuously picked up. As shown in FIG. 5B, plural picked-up images express how the object MV moves. As explained above, because image pickup is carried out with the direction of the digital camera 1 and the angle of view thereof being set at constant, there is no substantial change in a part (i.e., a background) other than the object MV in each continuously-picked-up image.

Frame numbers from 1 to p are allocated to individual continuously-picked-up images acquired by the continuous image-pickup operation in the order of image pickup time series. In the example case of FIG. 5B, images from frame 1 to frame 12 (i.e., p=12) are thus acquired.

As the continuous image-pickup is carried out in this fashion, a process for generating a flash image using the acquired continuously-picked-up images is sequentially executed. In this case, as the image-pickup control unit 212 notifies the picked-up image processing unit 213 that the continuous image-pickup has been terminated, the picked-up image processing unit 213 starts executing an "alignment process" for aligning the continuously-picked-up images (step S200). The "alignment process" will be explained with reference to the flowchart of FIG. 6.

As the process starts, the picked-up image processing unit 213 sets a frame (hereinafter, "reference frame N") which becomes a criteria when a displacement between the continuous picked-up images is detected among the picked-up image frames (1 to p) stored in the image memory 230 (step S201). In this step, for example, the first frame is set as the reference frame N.

Next, the picked-up image processing unit 213 specifies a frame next to the reference frame N (i.e., N+1) set in the step S201 to a pointer n specifying a picked-up image frame (step S202).

The picked-up image processing unit 213 detects a displacement VF between the reference frame N and an n-th frame (hereinafter, "frame n") (step S203). In this case, the picked-up image processing unit 213 acquires a vector indicating a position shifting between a characteristic point set over the reference frame N and that characteristic point over the frame n, thereby acquiring the displacement.

The displacement between the frames indicates, for example, a shaking of a whole picked-up image. As explained above, image pickup to generate a frame image is carried out with the direction of the digital camera 1 and the angle of view thereof being set at constant. Accordingly, it is preferable to carry out image pickup while fixing the digital camera 1 by a tripod or the like. However, image pickup may be carried out with the digital camera 1 being held by hands in some cases.

In the case in which the digital camera 1 is held by hands, the digital camera 1 may be moved while continuous image-pickup is carried out. A position shifting may be caused in such a case.

In this case, the picked-up image processing unit 213 determines whether or not the displacement VF detected in the step S203 is smaller than a first threshold th1 (step S204). Because a flash image is generated by synthesizing plural object images each indicating a motion of the object, it is desirable that a background part should be substantially constant across the picked-up plural frames. However, when a position shifting among the frames is caused because of the movement of the digital camera 1 as explained above, there is a large difference among the frames in the background part. As a result, when a flash image is generated in this case, the background part may duplicatingly appear. In order to distinguish such a frame, an upper limit value within an acceptable range in which it is possible to presume that the background is constant is set as the first threshold th1.

When the displacement VF between the reference frame N and the frame n is smaller than the first threshold th1 (step S204: YES), there is no large position shifting in the frame n relative to the reference frame N. In this case, the picked-up image processing unit 213 specifies the frame n as a frame (effective frame) which can be used for generation of a flash image (step S207).

In the embodiment, in an "effective frame selecting process" to be described later, an effective frame is selected based on a position of the object. Thus, the "effective frame" specified in the "alignment process" is called an "effective frame in a frame level". Moreover, the "effective frame" specified in the "effective frame selecting process" is called an "effective frame in an object level".

Conversely, when the displacement VF between the frames is larger than or equal to the threshold th1 (step S204: NO), the picked-up image processing unit 213 compares the displacement VF with a second threshold th2 (th1<th2) (step S205). Even if the displacement VF which is larger than or equal to the first threshold th1 is detected, a position shifting can be compensated within an acceptable range by performing an image processing which deforms the image of the frame n. Accordingly, an upper limit value within an acceptable range of the displacement VF which can be compensated by image deformation is set as the second threshold th2.

When the detected displacement VF is smaller than the second threshold th2 (step S205: YES), the picked-up image processing unit 213 executes an image processing of deforming the image of the frame n to carry out alignment (step S206).

Regarding the frame n which can be aligned by such image deformation, because the difference from the reference frame N is within an acceptable range, the picked-up image processing unit 213 specifies the frame n as an effective frame (in a frame level) which can be used for generation of a flash image (step S207).

Note that when the displacement VF between the frames is larger than or equal to the second threshold th2 (step S205: NO), it is difficult to set the difference from the reference frame N to be within an acceptable range even if image deformation is carried out. In this case, the picked-up image processing unit 213 specifies the frame n as an invalid frame in order to remove such a frame from a candidate to be synthesized when generating a flash image (step S208).

The picked-up image processing unit 213 which has executed the foregoing process creates a "frame information table" shown in FIG. 7 in the main memory device (memory) or the like in order to record information on a picked-up frame image. As shown in FIG. 7, the "frame information table" has a record created with a frame number (1 to p) at the time of image pickup as a key. Each record has information on a corresponding frame.

The picked-up image processing unit 213 which has executed the foregoing process records information indicating whether or not a frame is an effective frame in a frame level and information indicating a comparison result of the displacement which is a difference from the reference frame N with each threshold in the "frame information table" for each frame. For example, regarding a frame specified in the step S207 as an "effective frame", "OK" is recorded in a field of an "effective frame (frame level)", and regarding a frame specified in the step S208 as an "invalid frame", "NG" is recorded.

After the foregoing processes are performed on the frame n, the picked-up image processing unit 213 increments the pointer by +1 in order to specify a next frame (step S209). Moreover, the picked-up image processing unit 213 executes the processes following the step S203 when the value of n is smaller than or equal to p which indicates a final frame of picked-up images (step S210: NO), thus sequentially specifying whether or not each frame is an effective frame in a frame level or an invalid frame.

Figure 3:
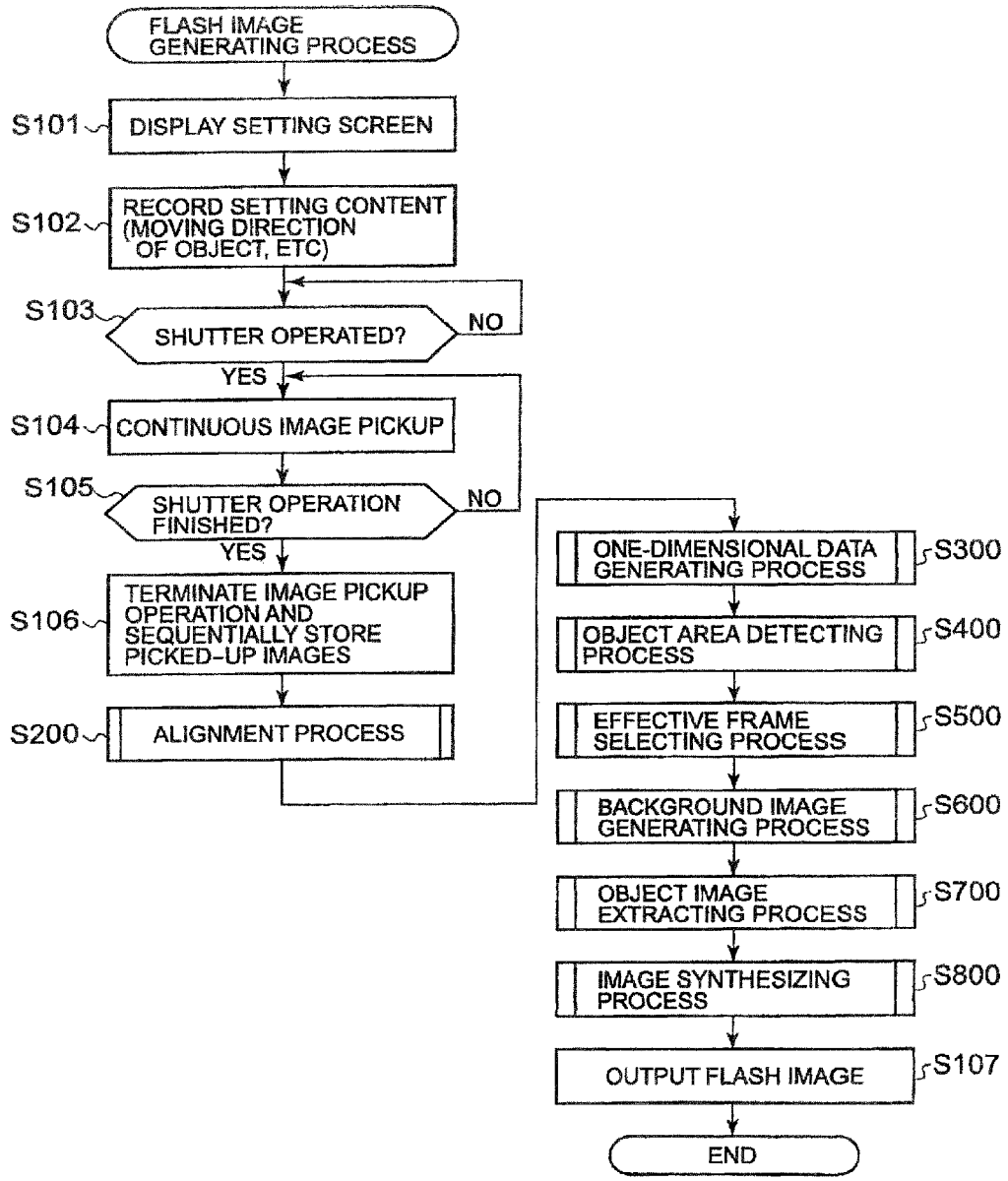
FIG. 3 is a flowchart for explaining a "flash image generating process" according to the embodiment of the present invention.

As the foregoing processes are performed on all frames of the picked-up images (step S210: YES), the process is terminated and the flow goes back to the "flash image generating process" (FIG. 3).

Note that if the digital camera 1 has a camera-shake compensation function, then the digital camera 1 should have the sensor unit (a gyro sensor or the like) 400 which detects a motion of the digital camera 1 itself. In this case, if a detection value detected by the sensor unit 400 at the time of continuous image-pickup is recorded for each frame, the displacement VF between frames can be acquired based on the recorded detection value.

Figure 8:
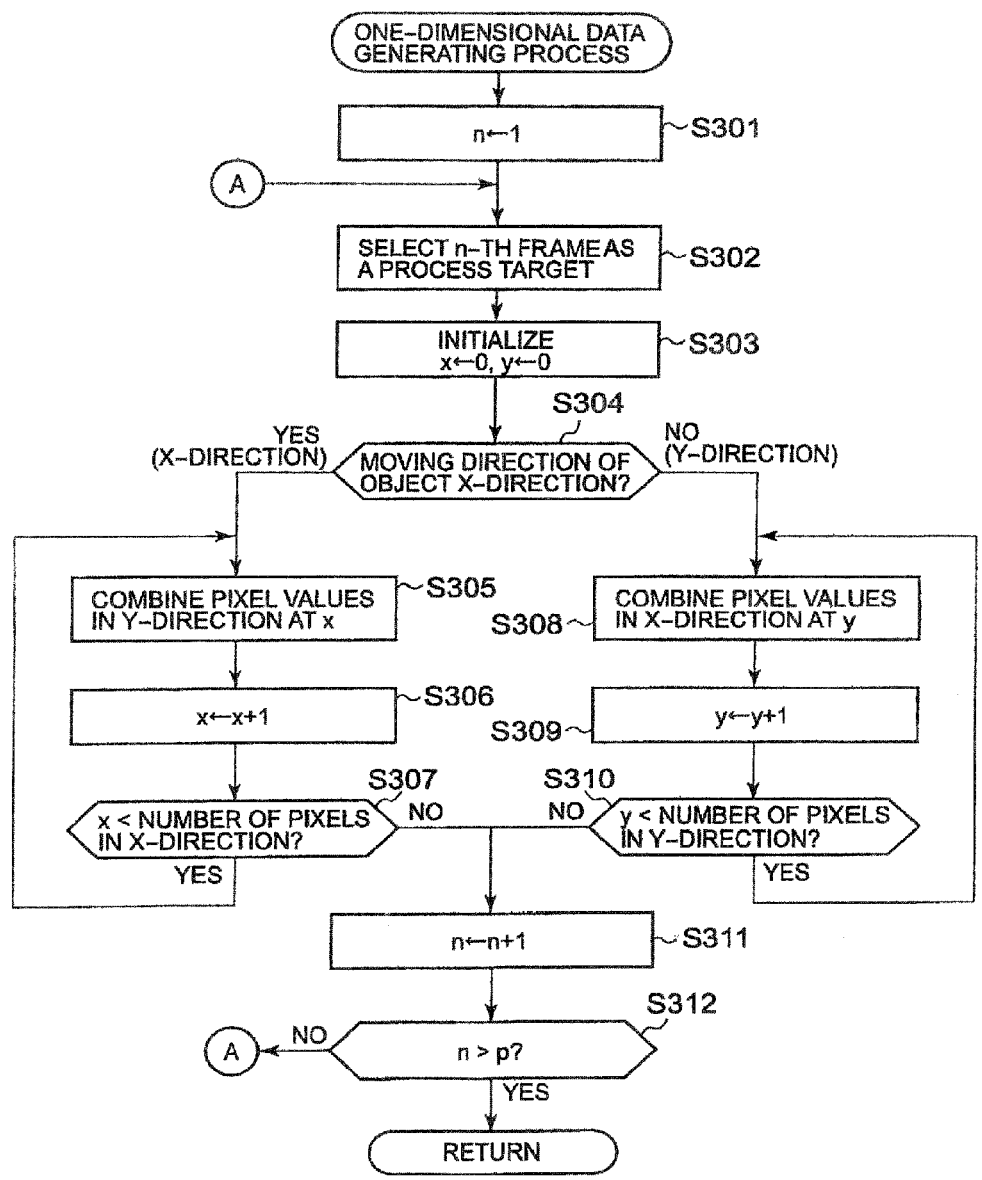
FIG. 8 is a flowchart for explaining a "one-dimensional data generating process" executed in the "flash image generating process" in FIG. 3.

As the "alignment process" completes, the picked-up image processing unit 213 executes a "one-dimensional data generating process" for converting a continuously-picked-up image into one-dimensional data (step S300). The one-dimensional data generating process will be explained with reference to a flowchart of FIG. 8. In order to facilitate understanding, it is assumed that the direction of the camera is set as a "horizontal position".

As the process starts, the picked-up image processing unit 213 sets an initial value "1" of the frame number to the pointer n (step S301), and selects, as a process target, an image (frame n) having a continuously-picked-up-image frame number of n stored in the image memory 230 (step S302).

Figure 9A:
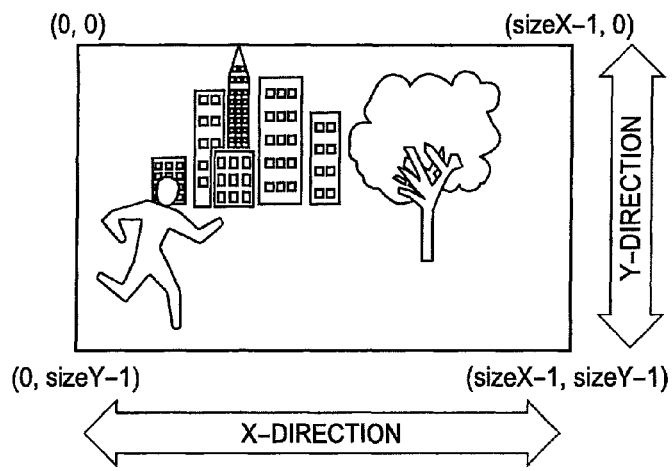
FIG. 9A is a drawing for explaining the "one-dimensional data generating process" in FIG. 8, and showing a relationship between a coordinate in a picked-up image and a moving direction of an object.

As a process target image is selected, the picked-up image processing unit 213 initializes a check coordinate in this image (step S303). In the embodiment, the picked-up image processing unit 213 takes a coordinate having an x-coordinate and a y-coordinate both of which are "0" as an initial check coordinate. An explanation will be given of a coordinate on an image with reference to FIG. 9A. In the embodiment, because the direction of the camera is set as a "horizontal position", a picked-up image acquired by the digital camera 1 through such a setting becomes a horizontally-long image as shown in FIG. 9A. In this case, the horizontal direction of the image is set as an "X-direction", and the vertical direction thereof is set as a "Y-direction". The upper left end of the image is taken as an origin (0, 0). In this case, if the number of pixels in the X-direction is sizeX, then the maximum value of the x-coordinate becomes sizeX−1. Likewise, if the number of pixels in the Y-direction is sizeY, then the maximum value of the y-coordinate becomes sizeY−1.

Next, the picked-up image processing unit 213 determines whether the moving direction of the object set in the step S102 in the foregoing flash image generating process (FIG. 3) is the X-direction or the Y-direction in the coordinate system of the picked-up image defined as shown in FIG. 9A (step S304). When the direction of the camera is the horizontal position, if either one of right or left is specified through the setting screen shown in FIG. 4B, the moving direction of the object becomes the X-direction (the horizontal direction). Conversely, if either one of up or down is specified, the moving direction of the object becomes the Y-direction (the vertical direction).

In the scene exemplified in FIG. 5A, because images of the object MV moving in the horizontal direction are picked up, it is determined that the moving direction of the object is the X-direction (step S304: YES). When the moving direction of the object is the X-direction, the picked-up image processing unit 213 executes a process of projecting an image in a direction orthogonal to the moving direction of the object, i.e., in the Y-direction.

In this case, the picked-up image processing unit 213 projects an image in the Y-direction by combining pixel values in the Y-direction at all coordinates in the X-direction of the process target image (step S305, step S306, and step S307: YES). Because the check coordinate is initialized in the step S303, first, the picked-up image processing unit 213 combines pixel values in y-coordinates corresponding to an x-coordinate 0 in the step S305, and stores the result in the main memory device (memory) of the control unit 210. Next, the picked-up image processing unit 213 increments a value of the x-coordinate by +1, and performs the same calculation for the next x-coordinate in the step S306. Such a process is repeated by what corresponds to the size of the image in the X-direction, i.e., the number of pixels in the X-direction.

Conversely, when the moving direction of the object is the Y-direction (vertical direction) (step S304: NO), an image is projected in a direction orthogonal to the moving direction, i.e., the X-direction according to the same technique (step S308, step S309, and step S310: YES).

As the projection in the process-target image completes (step S307: NO or step S310: NO), the picked-up image processing unit 213 increments the pointer by +1 (step S311). When the frame number corresponding to the new pointer n is smaller than or equal to the frame number p of the last frame (step S312: NO), the picked-up image processing unit 213 selects a next continuously-picked-up image as a process target (step S302).

Conversely, when projection completes for all continuously-picked-up images (step S312: YES), the process returns to the flow of the flash image generating process (FIG. 3).

Figure 9B:
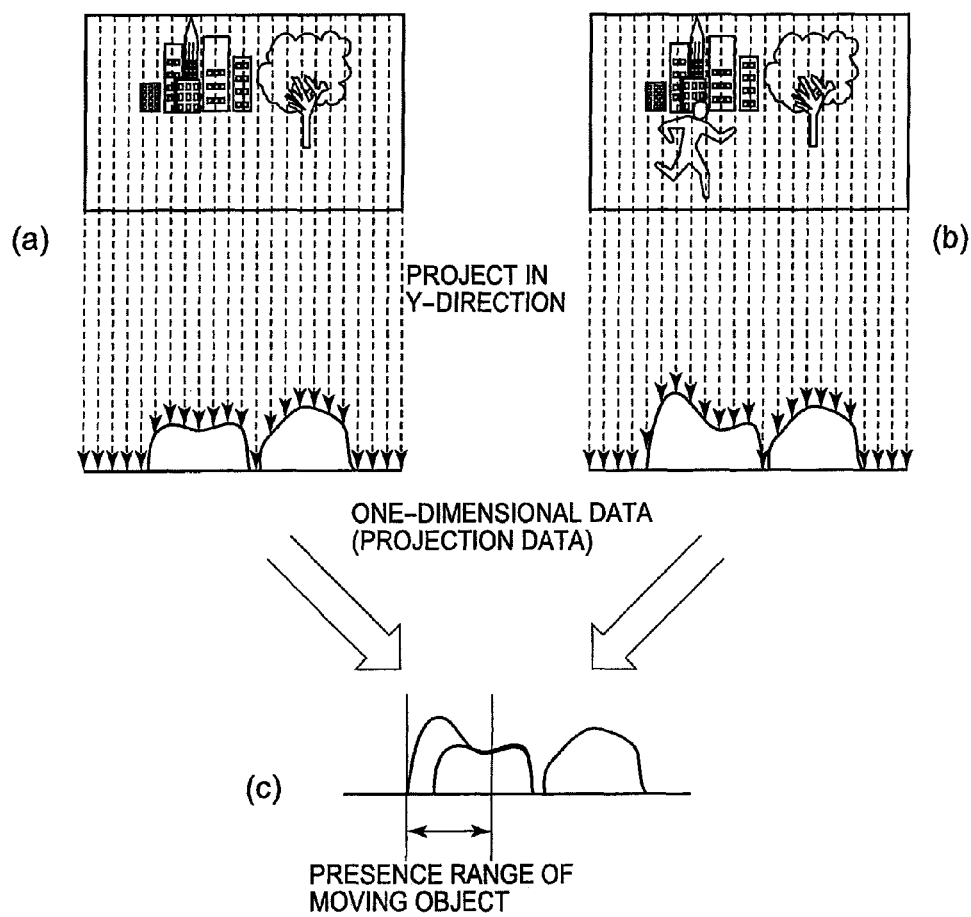
FIG. 9B is a drawing for explaining the "one-dimensional data generating process" in FIG. 8, wherein (a) and (b) show an example of a projection of a picked-up image and that of one-dimensional data, and (c) shows overlapped one-dimensional image data shown in (a) and (b)

According to such projection through the one-dimensional data generating process, each of the continuously-picked-up images is converted into one-dimensional data shown in, for example, FIG. 9B, (a) and (b). Generation of such one-dimensional data can be expressed by following equation 1.

$fn(x)$: projection of pixel value $Fn(x, y)$ in $Y$-direction  [Equation 1]

$fn(y)$: projection of pixel value $Fn(x, y)$ in $X$-direction $$fn(x) = \sum_{y=0}^{sizeY-1} Fn(x, y)$$

$$fn(y) = \sum_{x=0}^{sizeX-1} Fn(x, y)$$

sizeY : pixel number in Y-direction sizeX : pixel number in X-direction

In this fashion, as one-dimensional data (projection data) is created for each continuously-picked-up image, the picked-up image processing unit 213 sequentially stores the created one-dimensional data in the image memory 230 in association with the frame number of an original picked-up image. Moreover, the picked-up image processing unit 213 notifies the object detecting unit 214 that creation of one dimensional data is completed for all continuously-picked-up images. In response to the notification from the picked-up image processing unit 213, the object detecting unit 214 executes an "object area detecting process" of detecting an object part using converted one-dimensional data (step S400).

First, a concept of the process of detecting an object part from one-dimensional data for a continuously-picked-up image will be explained with reference to FIG. 9B, (a) to (c). FIG. 9B, (a) shows an example picked-up image (upper part) picked up without the object MV in the scene shown in FIG. 5A, and an example one-dimensional data (lower part) of such a picked-up image. FIG. 9B, (b) shows an example picked-up image (upper part) picked up with the object MV, and an example one-dimensional data (lower part) of such a picked-up image.

When the digital camera 1 of the embodiment generates a flash image, as explained above, because continuous image-pickup is carried out with the direction of the digital camera 1 and the angle of view thereof being set at constant, in the plural acquired continuously-picked-up images, there is no substantial change in the background part except the moving object MV. Accordingly, when one dimensional data among individual continuously-picked-up images are compared one another, there is a change in the range of the object MV. In order to facilitate understanding, one-dimensional data of an image having no object MV and that of an image having the object MV are shown in FIG. 9B, (a) and (b), respectively. When respective one-dimensional data are compared, data at a portion where the object MV appears in FIG. 9B, (b) differs from FIG. 9B, (a), while other portions are same.

That is, if one-dimensional data of both images are overlapped with each other as shown in FIG. 9B, (c), there is a portion which does not match with each other. Such a portion where one-dimensional data does not match is a range where the object MV appears (a range in the X-direction if the moving direction of the object is X-direction, and a range in the Y-direction if it is Y-direction). Accordingly, when a difference in one-dimensional data between adjoining continuously-picked-up images in the order of time series is acquired, a transition of the object range can be expressed.

Figure 10:
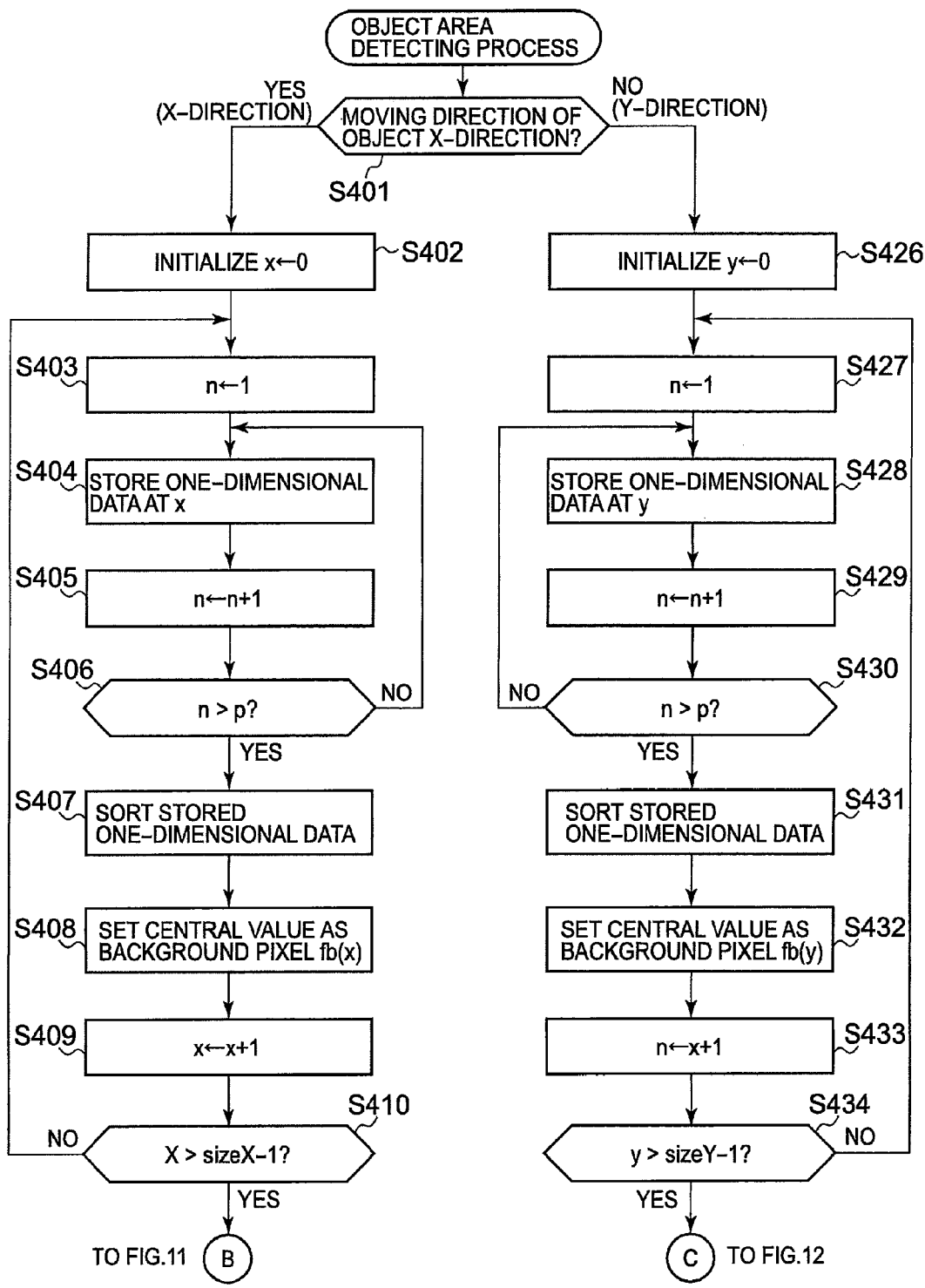
FIG. 10 is a flowchart for explaining an "object area detecting process" executed in the "flash image generating process" in FIG. 3.

The object detecting unit 214 executes the process based on such a principle, thereby detecting an object part in a continuously-picked-up image. The object area detecting process executed at this time (step S400) will be explained with reference to the flowcharts of FIGS. 10 to 12.

As the process starts, first, the object detecting unit 214 determines whether the moving direction of the object is the X-direction or the Y-direction based on the setting at the step S102 in the flash image generating process (FIG. 3) (step S401). Hereinafter, an explanation will be mainly given of a case in which the moving direction is the X-direction (step S401: YES).

In this case, the object detecting unit 214 initializes a coordinate in the X-direction which is a check target. As explained above, because the coordinate range of a picked-up image is from (0, 0) to (sizeX−1, sizeY−1), the initial value of an x-coordinate is set to be "0" (step S402).

Next, the object detecting unit 214 sequentially specifies frames of the continuously-picked-up images by specifying the pointer n so as to be 1 to p, and for each frame, acquires one-dimensional data corresponding to the coordinate x generated in the "one-dimensional data generating process" (FIG. 8) from the image memory 230, and stores such one-dimensional data in, for example, the main memory device (memory) of the control unit 210 (step S403 to step S406: NO).

As one-dimensional data for all frames are acquired (step S406: YES), the object detecting unit 214 sorts acquired one-dimensional data (step S407), and sets a central value thereof to be a pixel value fb(x) that the coordinate x indicates a background image (step S408).

Figure 11:
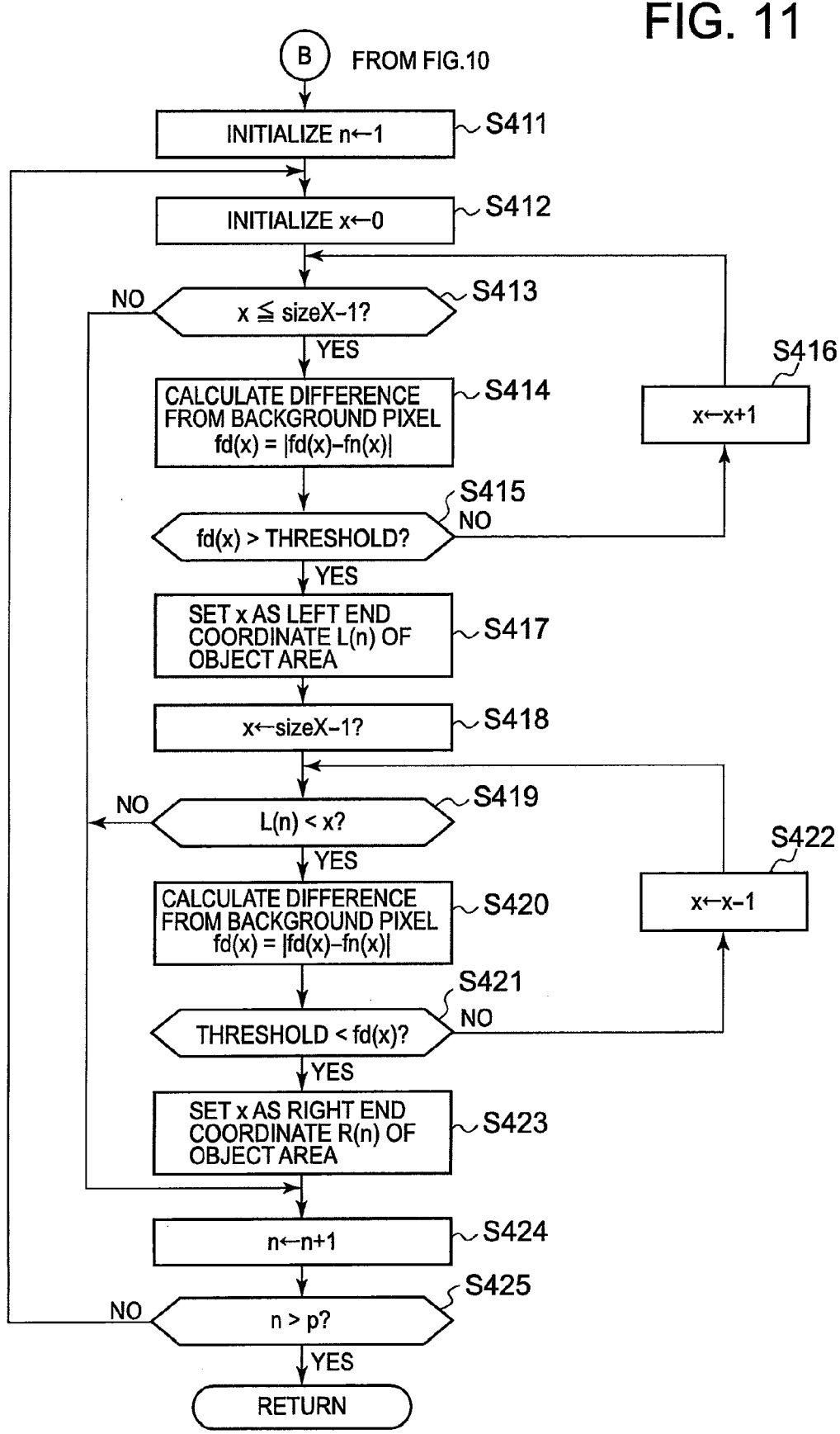
FIG. 11 is a flowchart for explaining the "object area detecting process" executed in the "flash image generating process" in FIG. 3.
Figure 12:
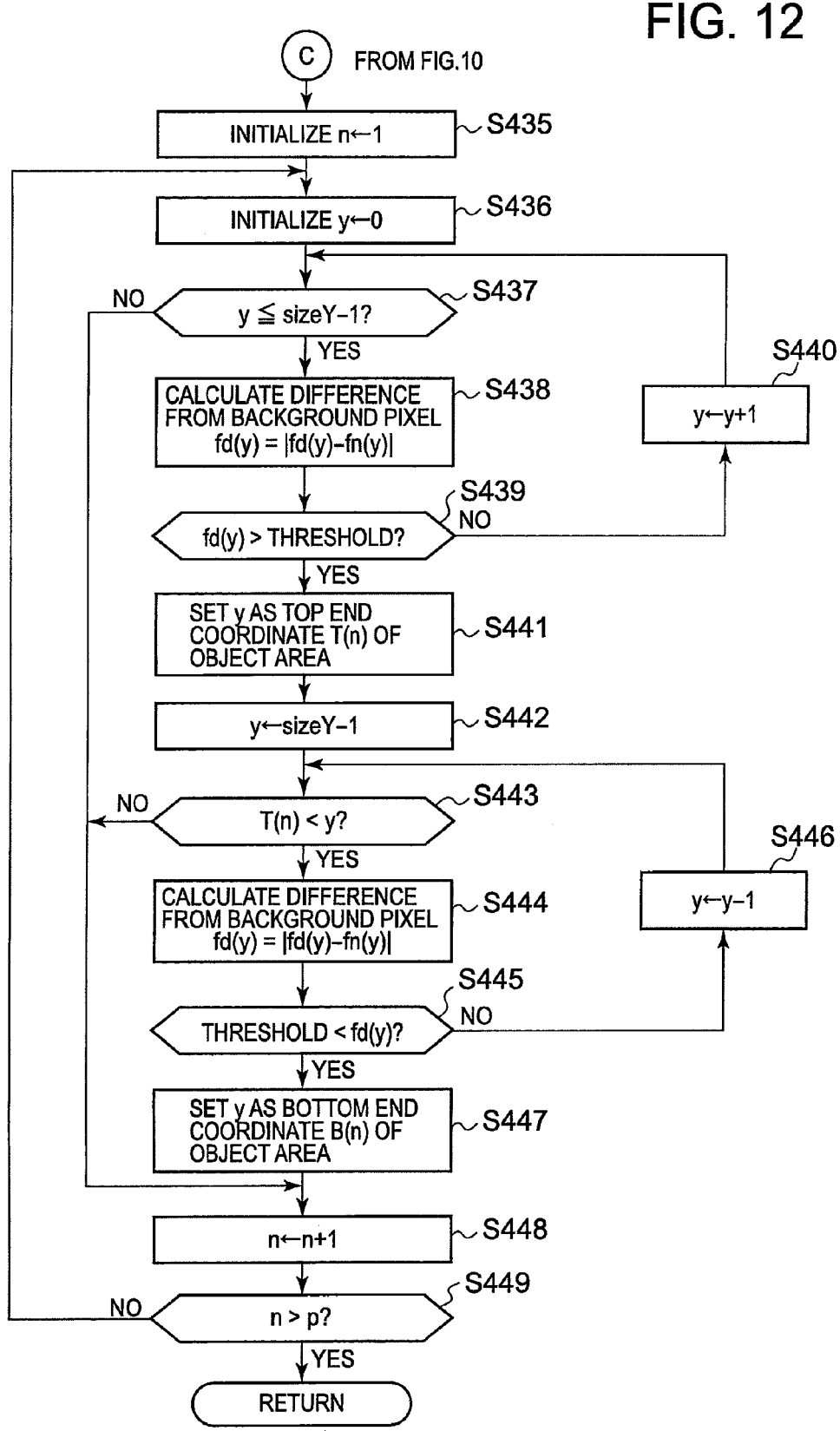
FIG. 12 is a flowchart for explaining the "object area detecting process" executed in the "flash image generating process" in FIG. 3.

The object detecting unit 214 performs such an operation at each point of the x-coordinate (step S409, and step S410: NO). As background pixel values fb(x) for all x-coordinates (0 to sizeX−1) in all frames are acquired (step S410: YES), the process progresses to step S411 (FIG. 11).

The object detecting unit 214 sets the pointer n to be a frame initial value "1", and sets the x-coordinate to be a coordinate initial value "0" (step S411, and step S412). Next, the object detecting unit 214 calculates a difference fd(x) (=|fb(x)−fn(x)|) between a pixel value fn(x) at the x-coordinate in an n-th frame and the background pixel value fb(x) at that x-coordinate acquired in the step S408 (step S413: YES, and step S414).

The object detecting unit 214 determines whether or not the calculated difference fd(x) is larger than a threshold DiffTh, thereby determining whether or not the coordinate x is a part representing the object (step S415). That is, because the background pixel value fb(x) is a pixel value when the coordinate x represents a background image, if an actual pixel value fn(x) greatly differs from the pixel value of the background image, the coordinate x in the frame n represents the object MV other than the background. Accordingly, the threshold DiffTh which enables such determination is set, and if the difference fd(x) is larger than the threshold DiffTh, it is possible to determine that the pixel value fn(x) is a pixel value representing an object part.

When the pixel value fd(x) is smaller than or equal to the threshold DiffTh (step S415: NO), the coordinate x in the n-th frame is not an object part. In this case, the object detecting unit 214 increments the x-coordinate by +1 (step S416), and if it is a coordinate within the image size (step S413: YES), the same determination is performed with respect to the next coordinate x (step S414, and step S415).

In the initialization in the step S412, because the x-coordinate is set to be "0" which is the left end of the image, when it is determined that the coordinate x which is the check coordinate indicates a pixel of the object part (step S415: YES), the object detecting unit 214 sets such x-coordinate as a coordinate L(n) which corresponds to the left end of the object part in the n-th frame (step S417).

That is, because determination is carried out while incrementing the x-coordinate by +1 from a position where x=0 which is the left end of the picked-up image, the process from the step S412 to the step S416 is a searching of the object part from the left end of the image. Because the object range for the x-coordinate has a width, it is necessary to specify the right end of the object range. Accordingly, as the left end of the object part is specified, the object detecting unit 214 performs an operation of searching the right end of the object part.

In this case, the object detecting unit 214 starts searching from the right end side of the picked-up image. Accordingly, the object detecting unit 214 sets a check coordinate x as sizeX−1 which is an x-coordinate indicating the right end of the picked-up image (step S418). Because the right end of the object part is a subject of searching, the check coordinate x must be located at right from the coordinate L(n) which is set as the left end of the object part in the step S417. Thus, when the check coordinate x is greater than L(n) (step S419: YES), the object detecting unit 214 calculates fd(x) for such coordinate x (step S420), and determines whether or not the calculated fd(x) is larger than the threshold DiffTh (step S421).

When fd(x) at the coordinate x is smaller than or equal to the threshold DiffTh, and does not indicates the object part (step S421: NO), the object detecting unit 214 decrements the check coordinate x by −1 to shift the check coordinate to left by what corresponds to 1 coordinate (step S422), and performs the same determination on such coordinate x (step S419, step S420, and step S421). In this fashion, the searching is carried out from the right end of the picked-up image, and when it is determined that a pixel at the check coordinate x indicates the object part (step S421: YES), the object detecting unit 214 sets such a coordinate x as a coordinate R(n) which is the right end of the object part in the frame n (step S423).

Note that when the object part is not detected while searching is started from the left end of the image (step S413: NO), and when the x-coordinate set from the right end is located at left from the object left end L(n) (step S419: NO), it is determined that there is no object part in the frame n, and for example, the value is set in such a way that L(n)=R(n), and a check target is shifted to the next frame (step S424).

Moreover, when the object range is detected for the frame n, the foregoing process is also carried out with the next frame being as a next check target (step S424, and step S425: NO). When the object area is detected for all frames (step S425: YES), the process returns to the "flash image generating process" (FIG. 3).

Figure 13A:
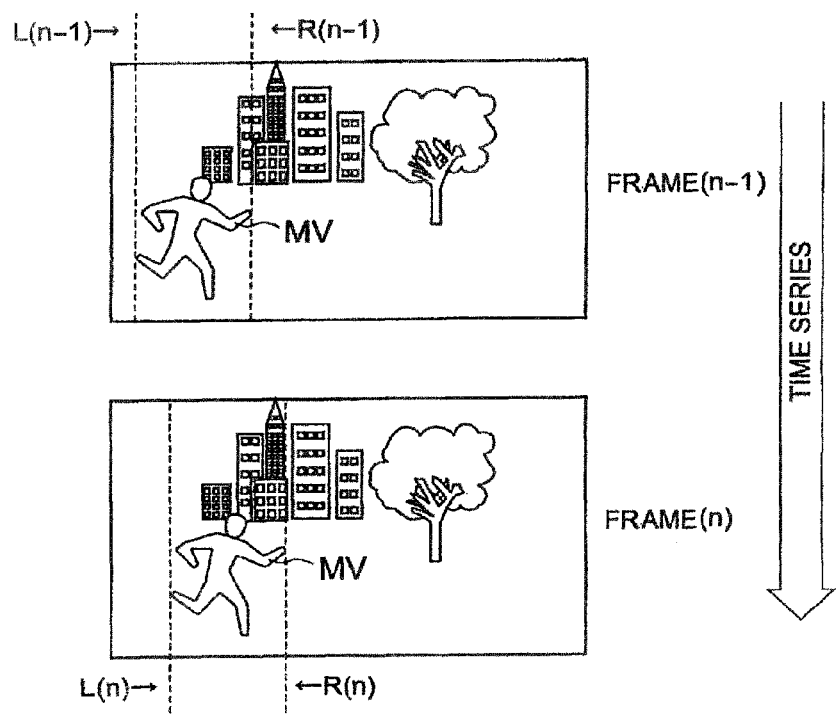
FIG. 13A is a drawing for explaining the "object area detecting process" in FIGS. 10 to 12, and showing an example of an object area detected when the moving direction of an object is X-direction.

This is how the object area is detected when the moving direction of the object is the X-direction. In this case, as shown in FIG. 13A, the range of the object MV appearing in each frame in the X-direction is sequentially acquired. The coordinates (L(n) and R(n)) of the object range acquired in this fashion are stored in the main memory device (memory) or the like in association with the frame number.

Figure 13B:
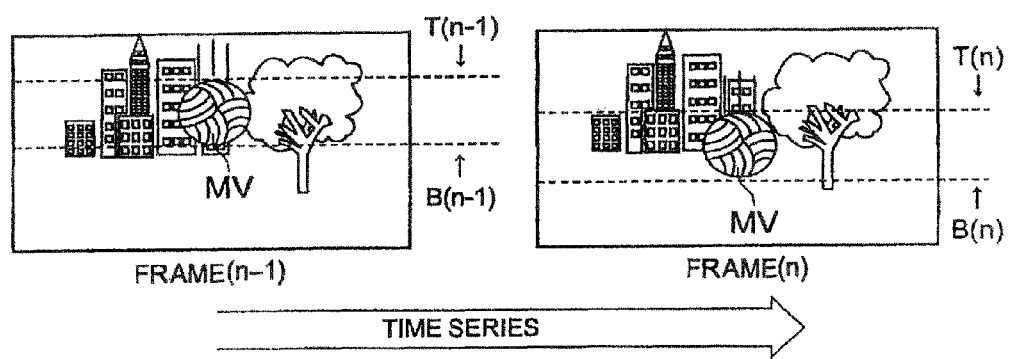
FIG. 13B is a drawing for explaining the "object area detecting process" in FIGS. 10 to 12, and showing an example of an object area detected when the moving direction of an object is Y-direction.

Conversely, when the moving direction of the object is the Y-direction, the same process as explained above is executed in the Y-direction. That is, through the step S426 to the step S434 in FIG. 10 and the step S435 to the step S449 in FIG. 12, an top end coordinate T(n) of the object image appearing in each frame and a bottom end coordinate B(n) thereof are acquired (see FIG. 13B).

As the object area is detected in this fashion, the object detecting unit 214 notifies the image selecting unit 215 that the object area is detected. In this case, the image selecting unit 215 executes the "effective frame selecting process" (step S500 in FIG. 3) for selecting a picked-up image (effective frame) used for generation of a flash image based on the detected object area. The effective frame selecting process will be explained with reference to the flowcharts of FIGS. 14 and 15.

Figure 14:
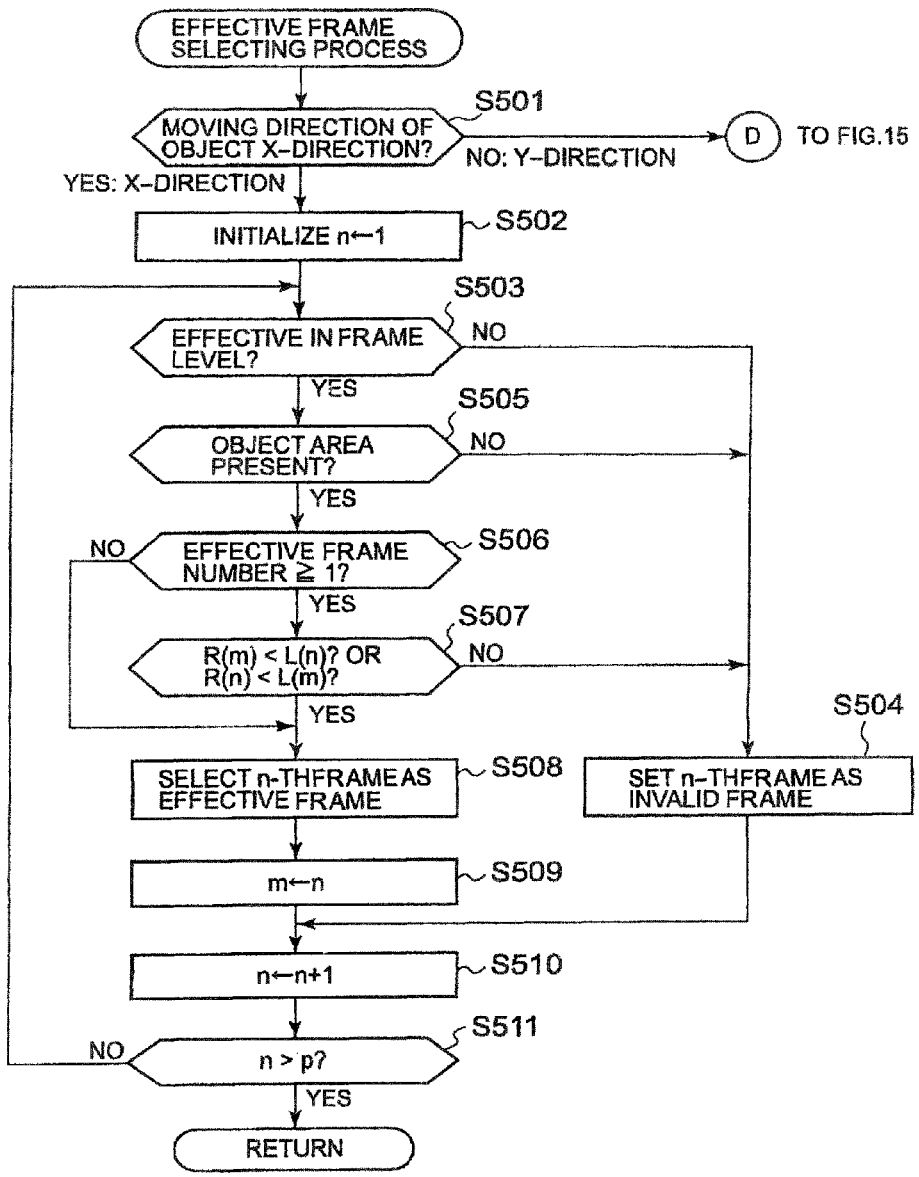
FIG. 14 is a flowchart for explaining an "effective frame selecting process" executed in the "flash image generating process" in FIG. 3.
Figure 15:
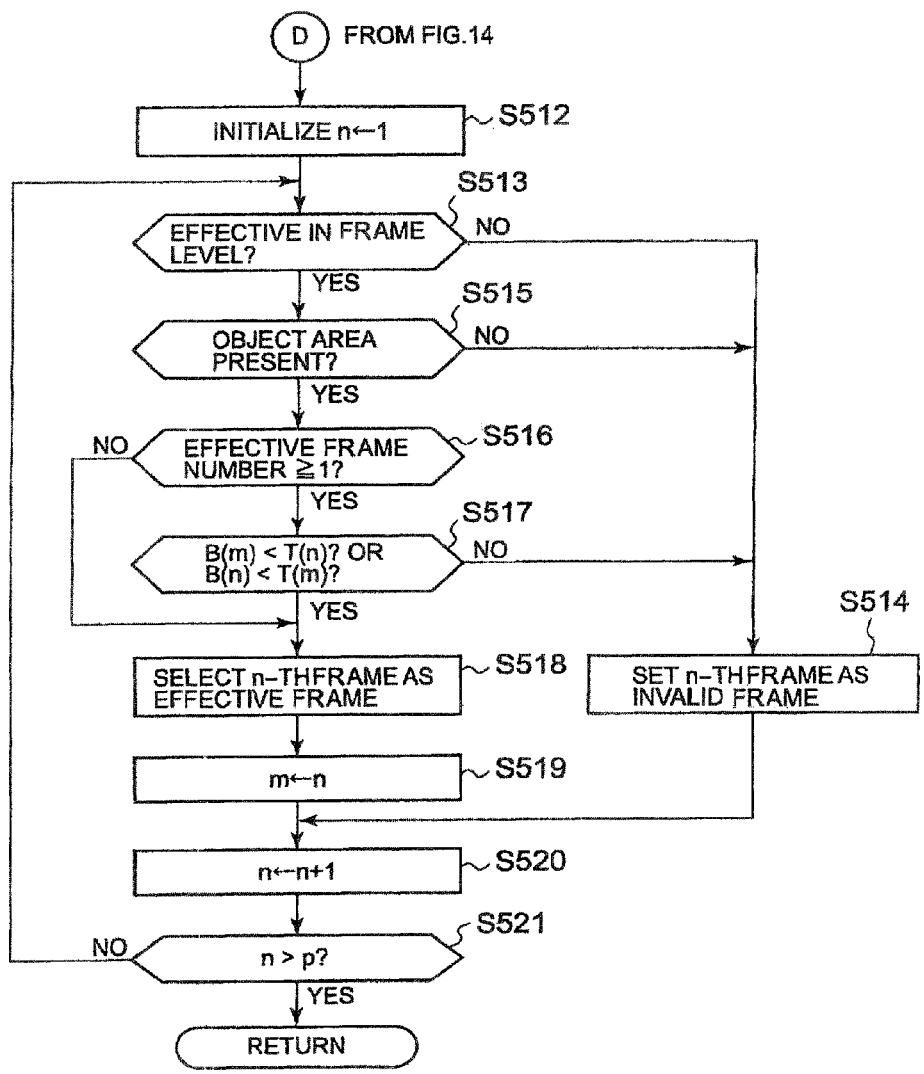
FIG. 15 is a flowchart for explaining the "effective frame selecting process" executed in the "flash image generating process" in FIG. 3.

As the process starts, first, the image selecting unit 215 determines whether the moving direction of the object is the X-direction or the Y-direction (step S501). The flowchart of FIG. 14 shows a process in a case in which the moving direction of the object is the X-direction. FIG. 15 shows a process in a case in which the moving direction is the Y-direction.

When the moving direction of the object is the X-direction (step S501: YES), the image selecting unit 215 sets the pointer n to be the frame initial value "1" (step S502). Next, the image selecting unit 215 determines whether or not the n-th frame (frame n) is specified as an effective frame in a frame level based on the process result in the foregoing "alignment process" (step S503). In this case, the image selecting unit 215 refers to the "frame information table" (FIG. 7) created in the main memory device (memory) of the control unit 210, thereby determining whether or not the frame n is specified as an effective frame in the frame level.

When the frame n is specified as an "invalid frame" in the frame level (step S503: NO), the background part is largely shifted from the reference frame N, so that if such a frame n is used for generation of a flash image, the background part may be duplicated. Accordingly, the image selecting unit 215 specifies such a frame n as an invalid frame also in this step (step S504).

In this case, according to the example of the "frame information table" shown in FIG. 7, for example, like the record of the frame number "3", "NG" is recorded in both fields of "effective frame (frame level)" and "effective frame (object level)".

Conversely, when the frame n is specified as an "effective frame" in the frame level (step S503: YES), the image selecting unit 215 determines whether or not the flam n contains an object area based on a detection result from the foregoing "object area detecting process" (step S505). When L(n) and R(n) (or T(n) and B(n)) indicating the range of the object area are recorded with respect to the frame n and L(n)≠R(n) (or T(n)≠B(n)) is satisfied, the image selecting unit 215 determines that the object area is detected from the frame n.

When no object area is detected from the frame n (step S505: NO), the image selecting unit 215 specifies the frame n as an invalid frame which is not used for generation of a flash image (step S504).

When the frame n is specified as the "invalid frame" in the step S504, the image selecting unit 215 increments the pointer n by +1 to specify the next frame (step S510). When the value of n is smaller than or equal to the number of the last frame p (step S511: NO), the flow returns to the step S503 and the process following the step S503 is repeated.

The image selecting unit 215 sequentially checks presence/absence of the object area in a frame specified as an effective frame in the frame level in this fashion. The image selecting unit 215 selects a frame that is determined as having the object area at first as an effective frame (step S505: YES, step S506: NO, and step S508). The image selecting unit 215 allocates an effective frame number which is different from the frame number to the frame (continuously-picked-up image) selected as the effective frame. In this case, the image selecting unit 215 allocates an effective frame number "1" to the frame which is selected as a first effective frame. Moreover, the image selecting unit 215 sets the frame number of the frame selected in the step S508 to a pointer m for specifying an effective frame (step S509).

The image selecting unit 215 records information indicating whether or not the frame is an effective frame in the frame level and the effective frame number allocated to the effective frame (object level) in the "frame information table" (FIG. 7).

First, the image selecting unit 215 selects a first effective frame, and sets the frame number thereof to the pointer m. Next, the image selecting unit 215 increments the pointer n by +1 to specify the next frame (step S510), and when the value of n is smaller than or equal to the number of the final frame p (step S511: NO), executes the process following the step S503. That is, the image selecting unit 215 searches a next frame to be used for generation of a flash image.

After the first effective frame is selected (step S506: YES), the image selecting unit 215 compares the position of the object area between a check target frame (n-th frame) and an effective frame (frame specified by pointer m) selected most recently, thereby selecting a frame having the object part which does not overlap the previous effective frame as an effective frame.

When the moving direction of the object is the X-direction, there are two movements: one from left to right; and another from right to left. When the object moves from left to right, the object area in the frame n must be located at right from the object area in the frame m. Conversely, when the object moves from right to left, the object area in the frame n must be located at left from the object area in the frame m.

Accordingly, the image selecting unit 215 determines that no object part of the frame n overlaps the object part of the frame m when the object left end L(n) in the frame n is larger than the object right end R(m) in the frame m or when the object right end R(n) in the frame n is smaller than the object left end L(m) in the frame m (step S507).

When the object area of the frame n satisfies such a condition (step S507: YES), the image selecting unit 215 selects the n-th frame as an effective frame (step S508). Conversely, when the object area of the frame n does not satisfy such a condition (step S507: NO), the image selecting unit 215 specifies the n-th frame as an invalid frame not used for generation of a flash image (step S504).

Regarding following continuously-picked-up images, selection of an effective frame based on such a determination condition is carried out, and as all continuously-picked-up images are checked and effective frames are selected (step S511: YES), as shown in FIG. 16, an effective frame to which an effective frame number different from the frame number is allocated and an invalid frame not used for generation of a flash image are distinguished.

Figure 16:
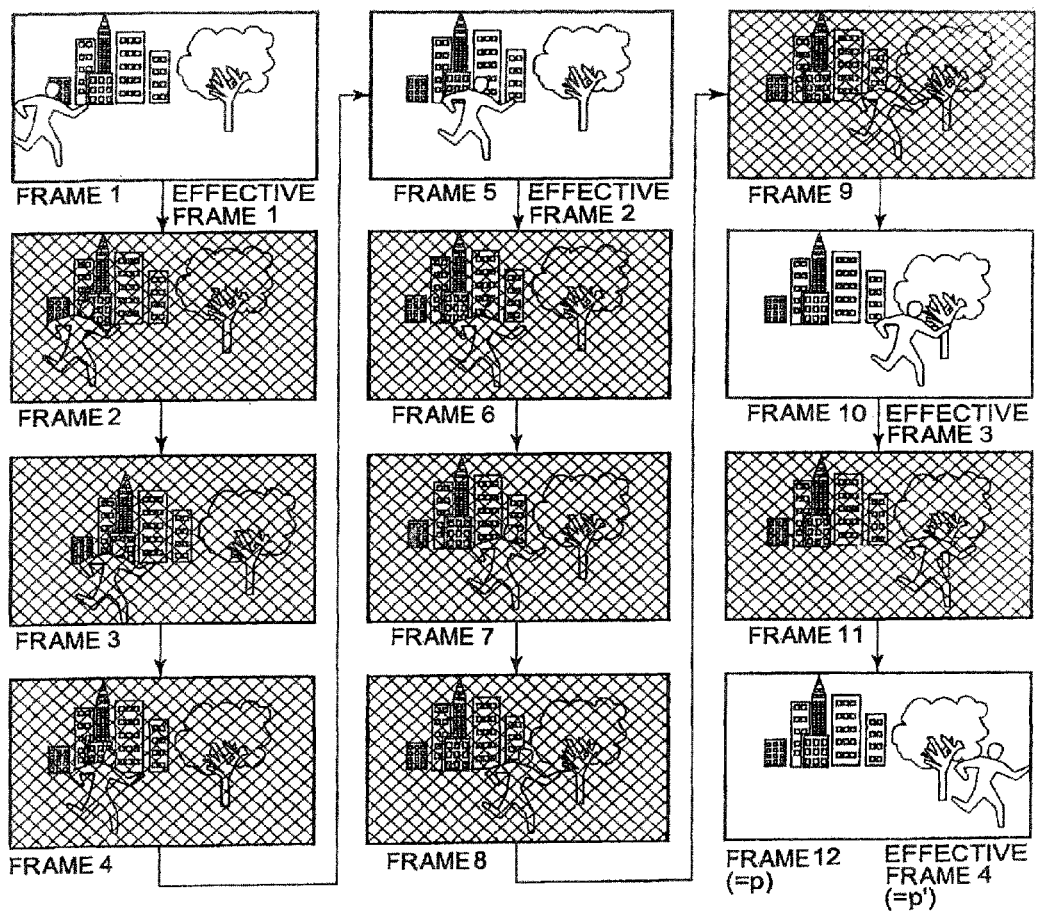
FIG. 16 is a drawing showing an example of a selected effective frame.

Note that as shown in FIG. 16, the effective frame number is a continuous number in the order of time series in selected effective frames. In this case, it is assumed that the number of selected effective frames is p' (p'≦p). By allocating identification information indicating a selected effective frame in this fashion, it is possible to distinguish an effective frame among the continuously-picked-up images stored in the image memory 230. However, only effective frames may be left in the image memory 230 by erasing invalid frames from the image memory 230.

This is the operation of selecting an effective frame when the object moves in the X-direction. An effective frame can also be selected through the same process when the moving direction of the object is the Y-direction (step S501: NO in FIG. 14). That is, by executing the process from step S512 to step S521 in the flowchart of FIG. 15, frames having images of the object moving in the Y-direction do not overlap one another can be selected as effective frames. In this case, regarding a selection condition after a first effective frame is selected, a case in which the object moves from up to down and a case in which the object moves from down to up are taken into account.

That is, when the object moves from up to down, the object area in the frame n must be located under the object area in the effective frame m selected most recently. Conversely, when the object moves from down to up, the object area in the frame n must be located above the object area in the effective frame m selected most recently.

Accordingly, the image selecting unit 215 determines that no object part of the frame n overlaps the object part of the effective frame m selected most recently when the object top end T(n) in the frame n is larger than the object bottom end B(m) or when the object bottom end B(n) in the frame n is smaller than the object top end T(m) in the frame m selected most recently (step S517 in FIG. 15).

As explained above, the object area is detected and frames which do not have an overlapped object area are selected from one-dimensional data acquired by projecting a picked-up image in one direction. That is, as an image (effective frame) used for generation of a flash image is selected based on one-dimensional data having a little data volume, the workload can be dramatically reduced in comparison with a case of using all data of picked-up images.

As an image (effective frame) used for generation of a flash image is selected in this fashion, in the "flash image generating process" (FIG. 3), a "background image generating process" (step S600) for generating a background image for the flash image and an "object image extracting process" (step S700) for extracting an image of the object part from an effective frame are sequentially executed using the image data of the selected frame.

Figure 17:
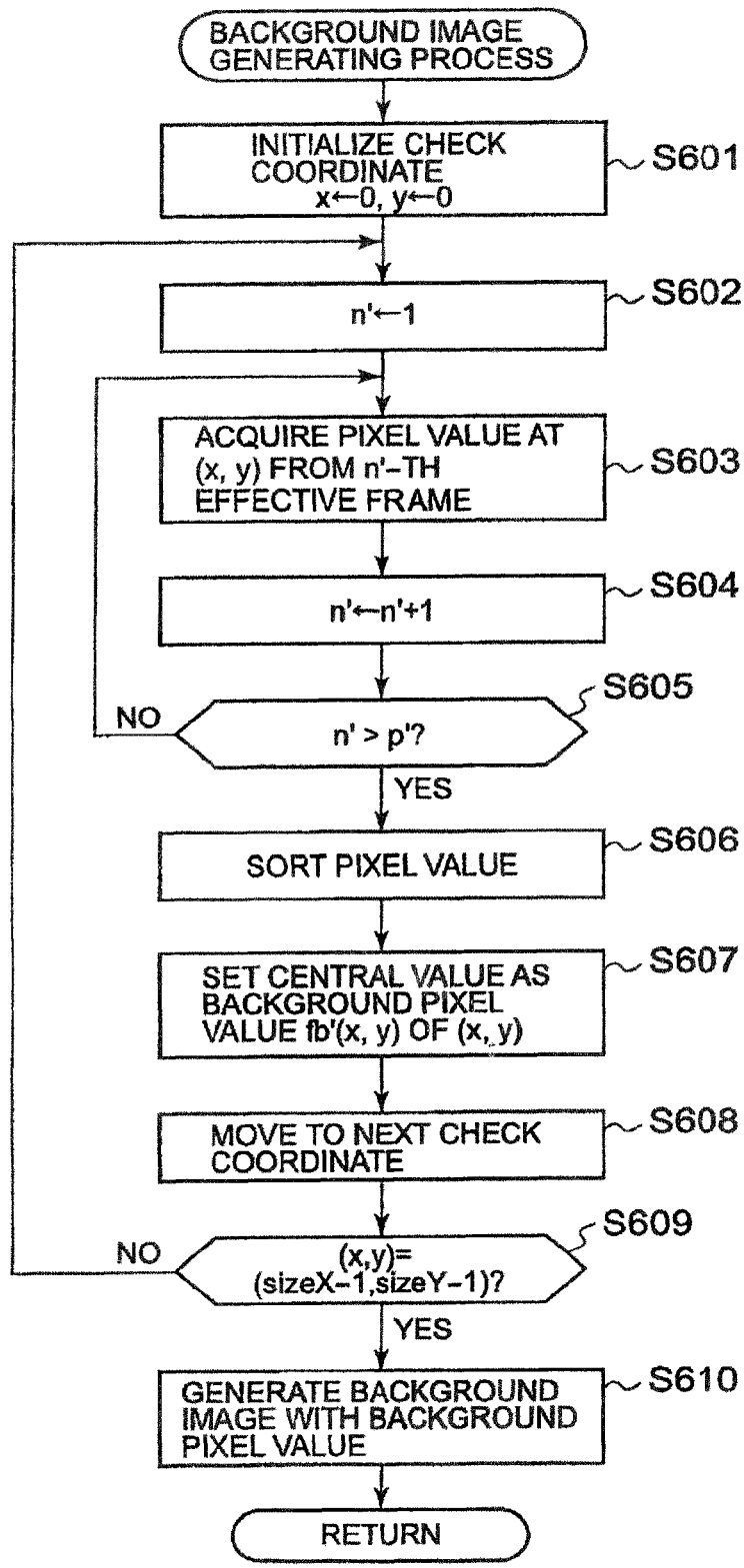
FIG. 17 is a flowchart for explaining a "background image generating process" executed in the "flash image generating process" in FIG. 3.

The "background image generating process" will be explained with reference to the flowchart of FIG. 17. The background image generating process is started as the image selecting unit 215 notifies the background image generating unit 216 that the effective frame selecting process completes.

As the process starts, the background image generating unit 216 initializes a coordinate (x, y) to be checked over an effective frame. Both x and y are set to be the initial value "0", so that the coordinate origin (0, 0) of the effective frame is set to be a check coordinate (step S601).

Next, the background image generating unit 216 causes a pointer n' which specifies an effective frame to sequentially specify 1 to p', thus sequentially acquiring pixel values of the set coordinate (x, y) from all effective frames (1 to p') stored in the image memory 230 (step S602 to step S604, and step S605: NO).

As the pixel values of the coordinate (x, y) are acquired from all effective frames (step S605: YES), the background image generating unit 216 sorts the acquired pixel values (step S606), and sets the central value thereof as a pixel value (background pixel value fb'(x, y)) that the coordinate (x, y) indicates a background part (step S607).

As a background pixel value fb'(x, y) for the coordinate (x, y) is acquired, the background image generating unit 216 sequentially sets coordinates in the image range of an effective frame as check coordinates, and acquires a background pixel value fb'(x, y) for the coordinate (x, y) (step S608, step S609: NO, and the step S602 to the step S607). For example, the x-coordinate is successively incremented by +1 for the same y-coordinate, the y-coordinate is incremented by +1 and the x-coordinate is initialized to 0 when the x-coordinate reaches the right end of the image, thereby sequentially acquiring pixel values from (0, 0) to (sizeX−1, sizeY−1), and acquiring background pixel values fb'(x, y) for individual coordinates.

As the background pixel values fb'(x, y) are acquired from all coordinates (step S609: YES), the background image generating unit 216 sets the acquired background pixel value fb'(x, y) as a pixel value at each coordinate, and generates a background image representing only a background part in the effective frame (step S610). The background image generating unit 216 stores the generated background image in the image memory 230, and notifies the object detecting unit 214 that the background image is created to terminate the process.

In this case, the process returns to the flash image generating process (FIG. 3), and the "object image extracting process" (step S700) is then executed. The object image extracting process is executed by the object detecting unit 214 as the background image is generated. The object image extracting process will be explained with reference to the flowchart of FIG. 18.

As the process starts, first, the object detecting unit 214 initializes a coordinate (x, y) (step S701) and initializes a target frame (step S702). Next, the object detecting unit 214 sequentially acquires a pixel value fn'(x, y) at a coordinate (x, y) from each of the effective frames 1 to p', and calculates a difference fd'(x, y) between such a pixel value fn'(x, y) and the background pixel value fb'(x, y) at that coordinate (x, y) (step S703 to step S705, and step S706: NO).

As differences fd'(x, y) at the coordinate (x, y) are acquired from all effective frames (step S706: YES), the object detecting unit 214 calculates a standard deviation fs(x, y) of the calculated differences fd'(x, y) (step S707). In the embodiment, for example, the object detecting unit 214 operates equation 2 to acquire the standard deviation fs(x, y).

$$fs(x, y) = \sqrt{\frac{\sum_{n'=1}^{p'} (fd'(n', x, y)^2)}{p' - 1}} \quad \text{[Equation 2]}$$

where fd'(n', x, y) is a difference fd'(x, y) at the coordinate (x, y) in a frame n'.

As the standard deviation fs(x, y) at the coordinate (x, y) is acquired, the object detecting unit 214 shifts the check coordinate within the image range of the effective frame, and sequentially acquires a standard deviation fs (x, y) at each coordinate (step S708, step S709: NO, the step S702 to the step S707).

As the standard deviation fs(x, y) at each coordinate is acquired (step S709: YES), the object detecting unit 214 sets a variable threshold move used for determination of the object part in each effective frame based on the acquired standard deviations fs(x, y) (step S710). In the embodiment, for example, the object detecting unit 214 operates equation 3 to set the variable threshold move.

$$\text{over}[m] = fd'(n', x, y) \begin{cases} fs(x, y) < fd'(n', x, y) \\ 1 \le m \le \text{max} n \end{cases} \quad \text{[Equation 3]}$$

$$\text{move} = \sqrt{\frac{\sum_{m=1}^{\text{max} m} (\text{over }[m]^2)}{\text{max} m - 1}}$$

maxn : number of pixels satisfying $fs(x, y) <$ $$fd'(n', x, y)$$

As the variable threshold move is set, the object detecting unit 214 acquires a pixel value which satisfies a difference fd'(x, y)≧variable threshold value move from each of the effective frames (1 to p') stored in the image memory 230 (step S711, and step S712).

Figure 19:
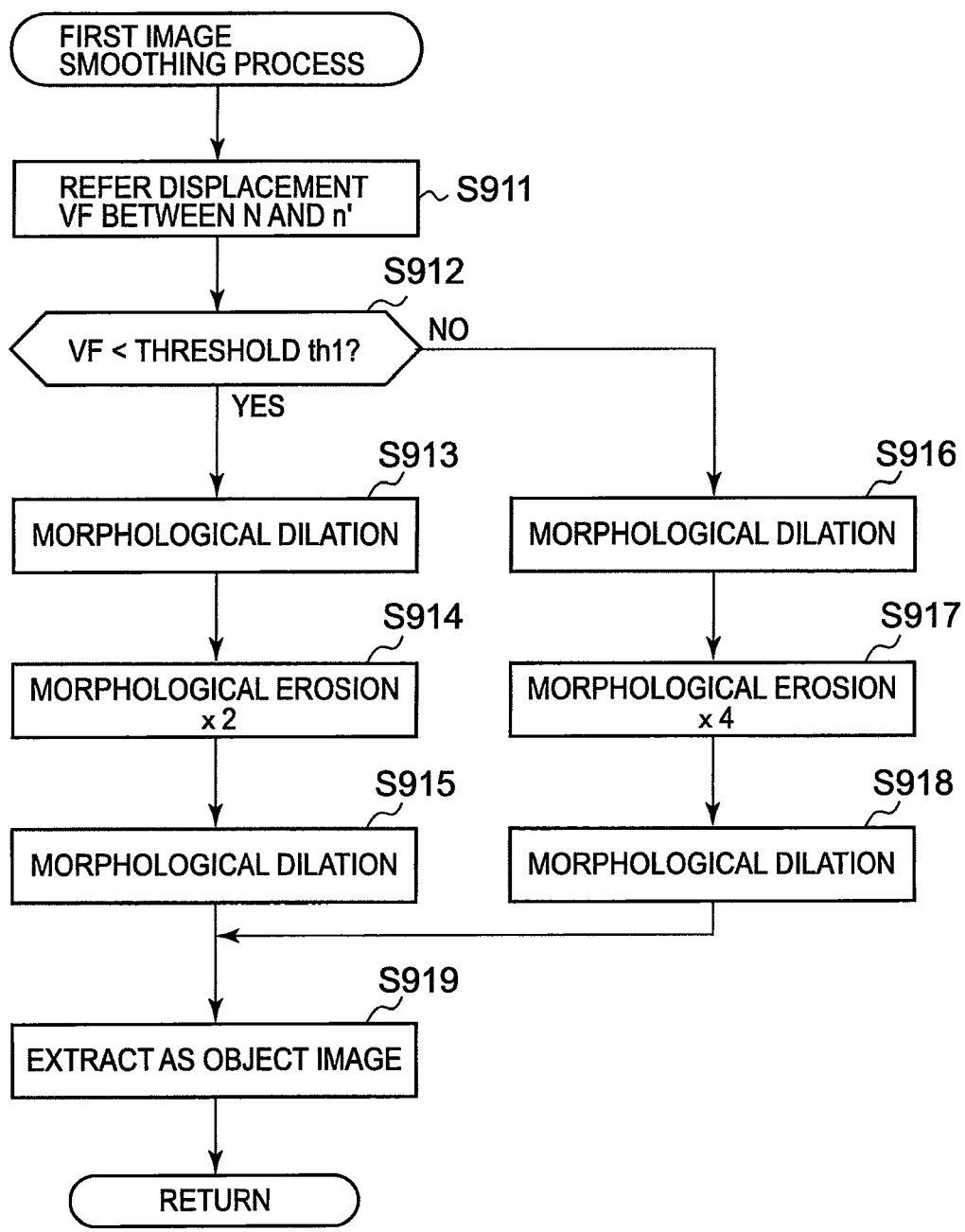
FIG. 19 a flowchart for explaining a "first image smoothing process" executed in the "flash image generating process" in FIG. 3.

The object detecting unit 214 sets a pixel value satisfying such a condition as a pixel value indicating an object part in the frame n' (step S713), and performs an "image smoothing process" on the object part indicated by that pixel value in order to compensate a deficit of an image (step S900). The "first image smoothing process" according to the embodiment will be explained with reference to the flowchart of FIG. 19.

As the process starts, the object detecting unit 214 refers to information on a displacement VF between the frame n' and the reference frame N from the "frame information table" (FIG. 7) created in the main memory device (memory) of the control unit 210 (step S911), and determines whether or not the displacement VF is less than the first threshold th1 (step S912).

As explained above, because the first threshold th1 is the upper limit value of the acceptable range of the displacement VF that the background can be presumed as constant between frames, when the displacement VF from the reference frame N is smaller than the first threshold th1, a difference between the frames is small, so that a difference in the background part is also small.

Accordingly, in such a case (step S912: YES), the object detecting unit 214 performs morphological operation for repairing a deficit of the extracted object area and smoothing it at a normal workload. In the embodiment, for example, the object detecting unit 214 performs morphological dilation (step S913), performs morphological erosion twice (step S914), and then performs morphological dilation again (step S915).

Figure 6:
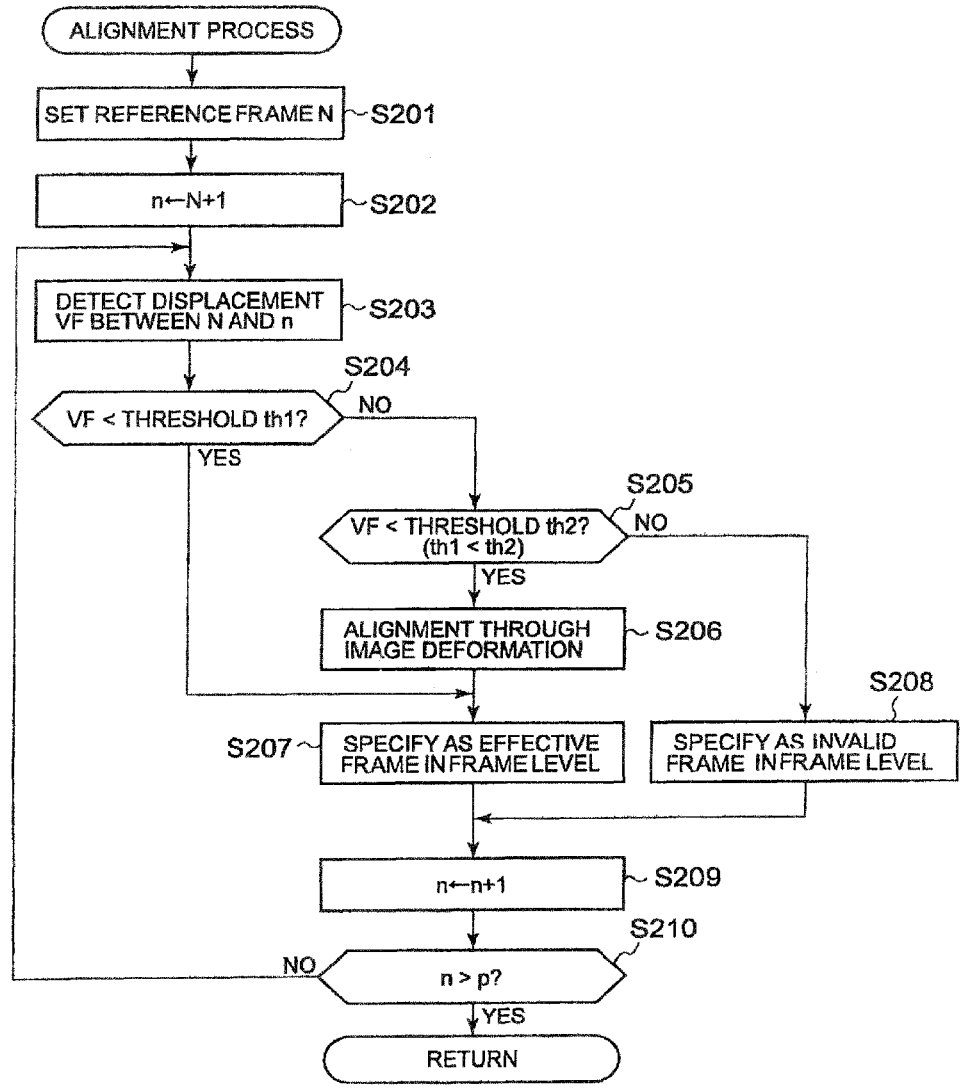
FIG. 6 is a flowchart for explaining an "alignment process" executed in the "flash image generating process" in FIG. 3.

Conversely, when the displacement VF is larger than or equal to the first threshold th1 (step S912: NO), alignment by image deformation has been performed on the frame n' in the foregoing "alignment process" (FIG. 6). In this case, because image deformation has been carried out, there may be a difference between an original image and a deformed image at the background part, and such a different part may be falsely recognized as the object MV.

Figure 20:
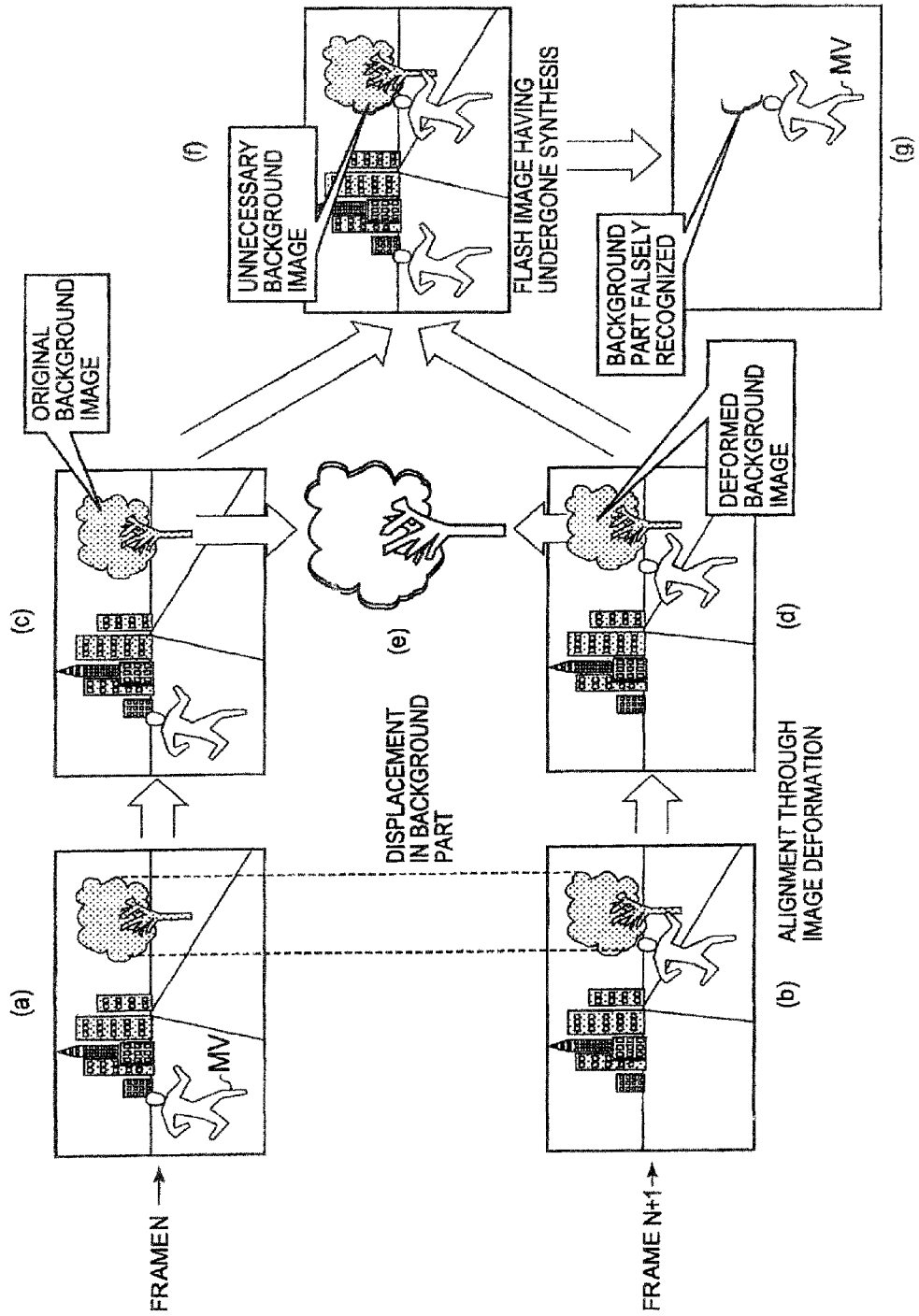
FIG. 20 is a drawing for explaining how occlusion effects, and wherein (a) shows an example scene that is likely to be affected by occlusion, (b) shows an example frame image having a displacement in a background part, (c) shows an example of an original background image, (d) shows an example background image deformed for alignment, (e) shows an example of a difference caused between an original background image and a deformed background image, (f) is an example flash image affected by occlusion, and (g) shows an example of an unnecessary part falsely recognized as an object image.
Figure 21:
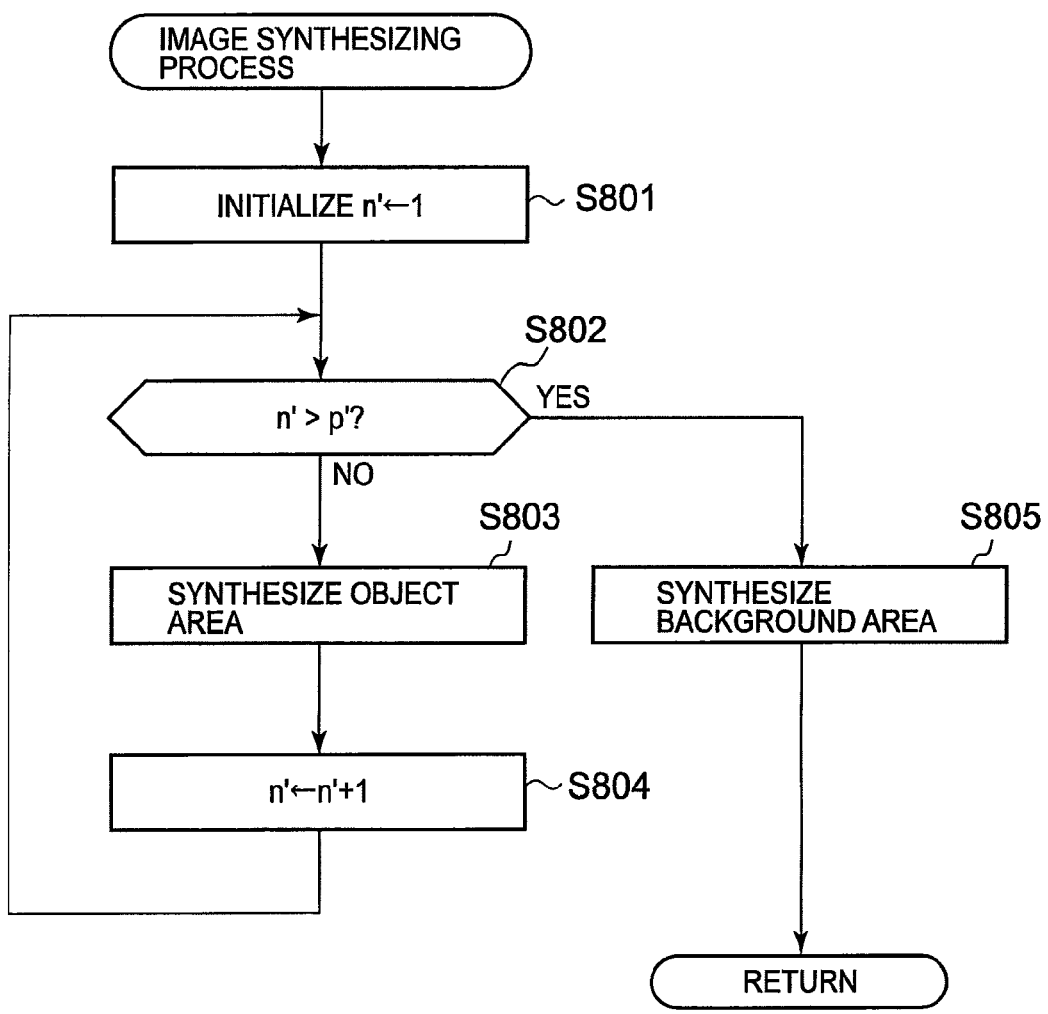
FIG. 21 is a flowchart for explaining an "image synthesizing process" executed in the "flash image generating process" in FIG. 3.

In particular, when an image of a scene having a deep depth as exemplified in FIG. 20, (a) is picked up, because of the effect of so-called occlusion, a difference in the background when the entire frame image moves tends to be large.

For example, when a frame N+1 next to the frame image shown in FIG. 20, (a) is an image as shown in FIG. 20, (b), because of a slight movement of the digital camera due to image pickup with the digital camera 1 being held by hands, a fluctuation occurs in the background part which must be originally constant, and if the displacement VF is larger than or equal to the first threshold th1, alignment by image deformation is performed on the frame N+1 in the foregoing "alignment process" (FIG. 6).

In this case, as shown in FIG. 20, (c), the frame N has an original background image, but as shown in FIG. 20, (d), the frame N+1 has a deformed background image. Because alignment by image deformation has been carried out, even if the position of the background image of the frame N and that of the background image of the frame N+1 is same, as shown in FIG. 20, (e), a difference in the shape or the like of the background image is caused.

In the case of the scene having a deep depth as shown in FIG. 20, such a difference in the shape of the background part becomes a large difference because of the effect of occlusion. If a background image and object areas are extracted from such images to synthesize a flash image, as shown in FIG. 20, (f), a partial difference may appear in the background part. Because the background part must be originally constant, such a part is an unnecessary background image.

When such an unnecessary part is present in the vicinity of the object MV on a frame image, as shown in FIG. 20, (g), such an unnecessary part may be falsely recognized as the object MV and extracted. Smoothing by the foregoing morphological operation is for repairing a deficit of the object image and compensating it, so if the amount of operation is increased at that time, the falsely-recognized background part shown in FIG. 20, (g) can be erased.

However, if the amount of operation is equally increased, the workload increases, resulting in a longer process time for generating a flash image. Moreover, when an area which must be originally recognized as the object MV (dynamic body) is relatively small, such an area may also be erased. Accordingly, if the weight of the smoothing process is changed for a frame which is likely to be affected by occlusion and for a frame not likely to be affected, an area having a background part falsely recognized as the object (dynamic body) can be effectively eliminated.

Therefore, in the process, it is determined whether or not a target frame is likely to be affected by occlusion based on the displacement VF between frames, and the amount of process of morphological operation is changed based on the determination result.

Thus, when the displacement VF between frames is larger than or equal to the first threshold th1 (step S912: NO), the object detecting unit 214 increases the amount of process of morphological operation, thereby eliminating an unnecessary part present in the vicinity of the object MV. In this case, the object detecting unit 214 performs morphological operation having an increased amount of operation more than a general process amount on the target flam n'. In the embodiment, for example, the object detecting unit 214 performs morphological dilation (step S916), performs morphological erosion four times (step S917), and then performs morphological dilation again (step S918).

In the case of the embodiment, morphological erosion having the amount of process twice as much as a normal morphological operation is performed on a frame which is determined as a frame likely to be affected by occlusion based on the displacement VF between frames. By increasing the amount of process (number of times) of the morphological erosion, a tendency of eliminating a minute difference can be enhanced, and even if a background part is falsely recognized as the object (dynamic body) because of occlusion, such an area can be eliminated.

As morphological operation is performed in this fashion based on the displacement VF between frames, the object detecting unit 214 extracts a smoothed object area as a final object image (step S919). In this case, for example, the object detecting unit 214 generates data in which a coordinate that satisfies a difference fd'(x, y)≧variable threshold move becomes "1", and in which a coordinate that satisfies a difference fd'(x, y)<variable threshold move becomes "0". With respect to generated data for 0 and 1, for example, labeling of allocating a unique number to each of continuous areas to which a value "1" is allocated is performed. A pixel value of an area which becomes the maximum among the areas having undergone labeling is set to be a pixel value indicating an object part in the frame n'.

In the foregoing "first smoothing process", the amount of process of morphological operation is changed based on a comparison with the first threshold th1 used in the foregoing "alignment process" (FIG. 6). Because the criterion for setting the amount of process is the displacement between frames, the threshold for comparison is not limited to the first threshold th1 only. That is, a larger number of thresholds can be set, and the amount of process can be changed more finely by comparing the intra-frame displacement VF with those thresholds. In any cases, the larger the displacement between frames is, the more an unnecessary part generated due to the effect of occlusion can be effectively erased by increasing the amount of process of morphological operation.

Figure 18:
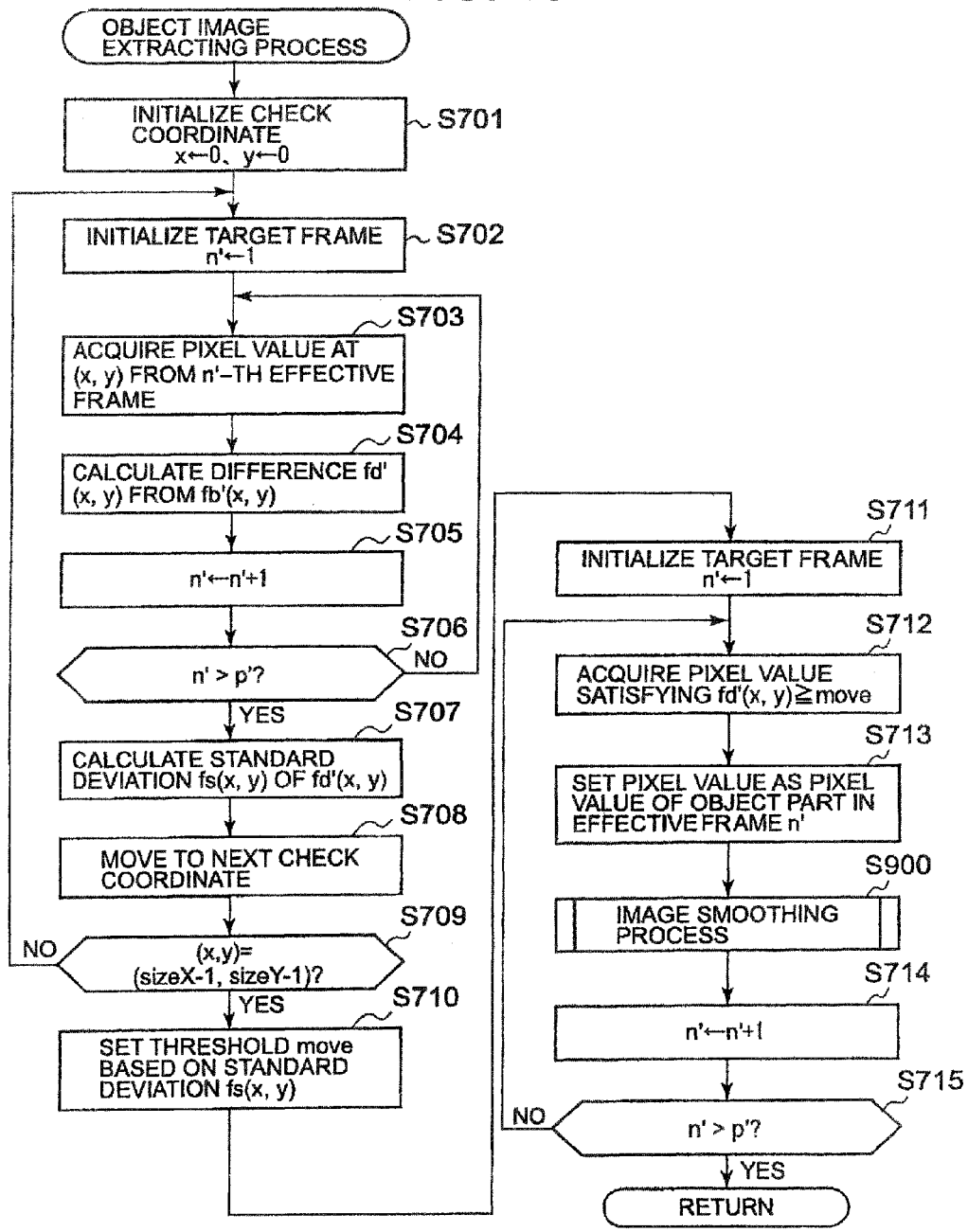
FIG. 18 is a flowchart for explaining an "object image extracting process" executed in the "flash image generating process" in FIG. 3.

When an object image that an unnecessary part is eliminated by the "first smoothing process" is extracted from the frame n', the process returns to the "object image extracting process" (FIG. 18). The pointer n' is incremented by +1 to specify the next effective frame (step S714), and if the n'-th effective frame is a frame present in the image memory 230 (step S715: NO), the process following the step S712 is executed. The object image is extracted from each effective frame in this fashion.

Through the foregoing process, as object images are extracted from all effective frames stored in the image memory 230, the object detecting unit 214 sends a notification to that effect to the flash image generating unit 217.

Figure 22:
FIG. 22 is a drawing showing an example of a generated flash image.

The flash image generating unit 217 synthesizes the background image generated through the "background image generating process" (step S600) in the "flash image generating process" (FIG. 3) with the object image in each effective frame extracted through the "object image extracting process" (step S700), thereby executing an "image synthesizing process" (step S800) for generating a flash image as shown in FIG. 22.

The "image synthesizing process" will be explained with reference to the flowchart of FIG. 22. The image synthesizing process is started as the object detecting unit 214 notifies the flash image generating unit 217 that the object image extracting process completes.

As the process starts, the flash image generating unit 217 initializes a target frame (step S801), and sequentially superimposes object images extracted from individual effective frames 1 to p' through the "object image extracting process" (step S700) to synthesize object areas of a flash image (step S802 to step S804).

As all object image areas of the flash image are synthesized (step S802: YES), the flash image generating unit 217 superimposes the background image generated through the "background image generating process" (step S600) to synthesize a background area of the flash image (step S805). Note that the background area of the flash image may be synthesized by superimposing any one image of the individual effective frames 1 to p'.

As the flash image is generated through the foregoing process, the flash image generating unit 217 stores the generated flash image in the image memory 230, and notifies the object detecting unit 214 that the flash image is generated to terminate the process.

In this case, the flow returns to the flash image generating process (FIG. 3), the generated flash image is displayed on the display unit 310 through the image output unit 240, and in accordance with an operation input as the user of the digital camera 1 operates the operation unit 330, the flash image is stored in the memory unit 250 or the external memory unit 260 (step S107). The process is then terminated.

Note that when the direction of the camera is the vertical direction, if the foregoing process is executed in a coordinate system in which the picked-up image is rotated by −90 degree or +90 degree, a flash image can also be generated.

Second Embodiment

Figure 23:
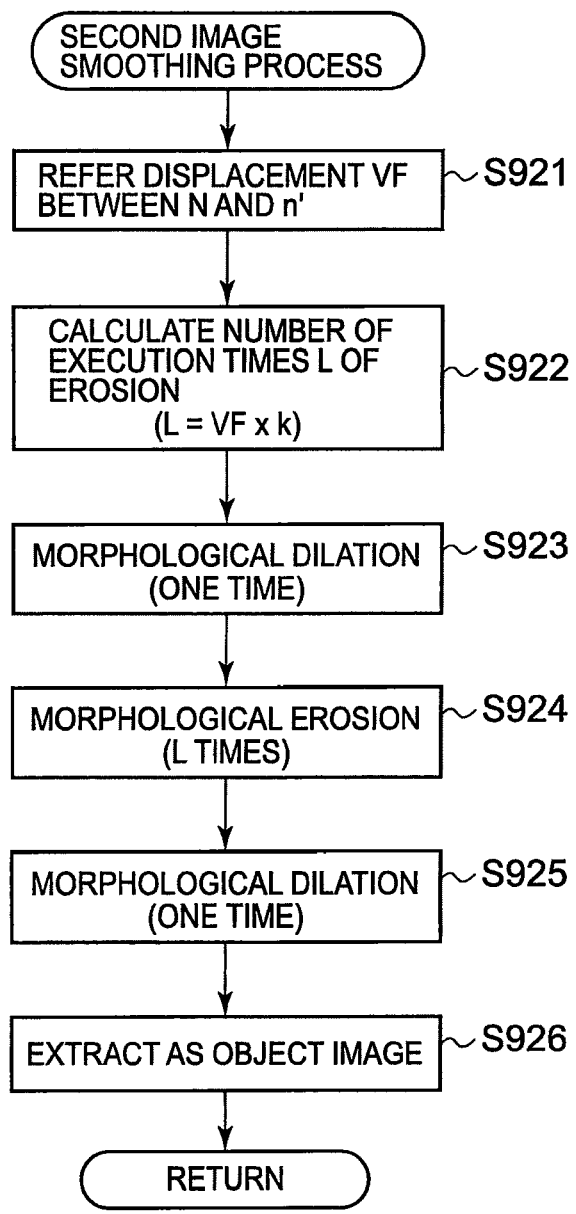
FIG. 23 is a flowchart for explaining a "second image smoothing process" according to a second embodiment of the present invention.

An explanation will be given of another example operation of the "image smoothing process" (FIG. 18, step S900) executed for eliminating an unnecessary part from an object image. In the "first image smoothing process" of the first embodiment, by comparing a displacement VF between frames with a threshold, a two-value mask process which changes the number of execution times of morphological erosion between twice and four times is executed. The number of execution times of morphological erosion can be more finely controlled in accordance with a displacement VF. A "second image smoothing process" executed in this case will be explained with reference to the flowchart of FIG. 23.

As the process starts, like the "first image smoothing process" of the first embodiment, the object detecting unit 214 accesses the "frame information table" (FIG. 7) created in the main memory device (memory) of the control unit 210, and refers to information on a displacement VF between a frame n' which is an extraction target frame for an object image and the reference frame N (step S921).

As the displacement VF is referred, the object detecting unit 214 performs calculation for setting the number of execution times of morphological erosion based on the displacement VF (step S922). The displacement VF is multiplied by a coefficient k (e.g., a positive integer greater than or equal to 1) to calculate the number of execution times L of morphological erosion (L=VF×k).

As the number of execution times L of morphological erosion is calculated, the object detecting unit 214 performs morphological dilation one time (step S923).

Next, as morphological dilation is performed one time, the object detecting unit 214 performs morphological erosion L times which is the number of execution times calculated at the step S922 (step S924).

Thereafter, as morphological erosion is performed L times, the object detecting unit 214 performs morphological dilation one time (step S925), and completes morphological operation for smoothing of an image.

As the morphological operation completes, the object detecting unit 214 extracts the smoothed object area as a final object image (step S926), and terminates the process (return to the flow of the "object image extracting process").

In the "second image smoothing process", by multiplying the displacement VF by the coefficient, the number of execution times of morphological erosion is calculated. Accordingly, the amount of process of morphological operation (morphological erosion) can be increased in proportion to the displacement between frames, resulting in further effective elimination of an unnecessary part which is likely to be generated because of occlusion.

In the "first image smoothing process" (first embodiment) and the "second image smoothing process" (second embodiment), as an example of morphological operation, the explanation has been given of a case in which morphological dilation, morphological erosion, and morphological dilation are performed in this order. However, an operation in which morphological erosion, morphological dilation, and morphological erosion are performed in this order may be added.

That is, in either case in which, as an operator defining the content of morphological operation, "Opening" (execution order: dilation; erosion; and dilation) is set or in which "Closing" (execution order: erosion; dilation; and erosion) is set, by changing the amount of process (number of execution times) in accordance with the displacement VF, an unnecessary part generated because of occlusion can be effectively eliminated.

In this case, it is optional to set the amount of process (number of execution times) for morphological erosion to which time of morphological erosion. For example, the number of execution times of all morphological erosion can be set to be larger than that of morphological dilation, and the number of execution times of morphological erosion only when "Opening" is set can be set to be larger than that of morphological dilation.

In the embodiment, the amount of process (number of execution times) of morphological erosion is increased in order to enhance a tendency of eliminating a minute difference. However, an unnecessary part can also be effectively erased by increasing the amount of process (number of execution times) of morphological dilation. That is, a target having an amount of process changed in accordance with the displacement between frames can be both of morphological erosion and morphological dilation.

Third Embodiment

In the "image smoothing process" in each of the foregoing embodiments, the explanation has been given of the example case in which the number of execution times of morphological operation is changed in accordance with a displacement VF. The amount of process to be changed is not limited to the number of execution times. An unnecessary part generated because of occlusion can also be effectively eliminated by changing the effect (i.e., the amount of erosion or dilation) of morphological operation in accordance with the displacement between frames.

That is, in morphological operation, erosion an dilation are carried out by chopping a target image with a "structuring element" having a simple shape or by adding such a structuring element to the target image, so if the size of the structuring element is changed, the amount of erosion or dilation can be changed.

Figure 24:
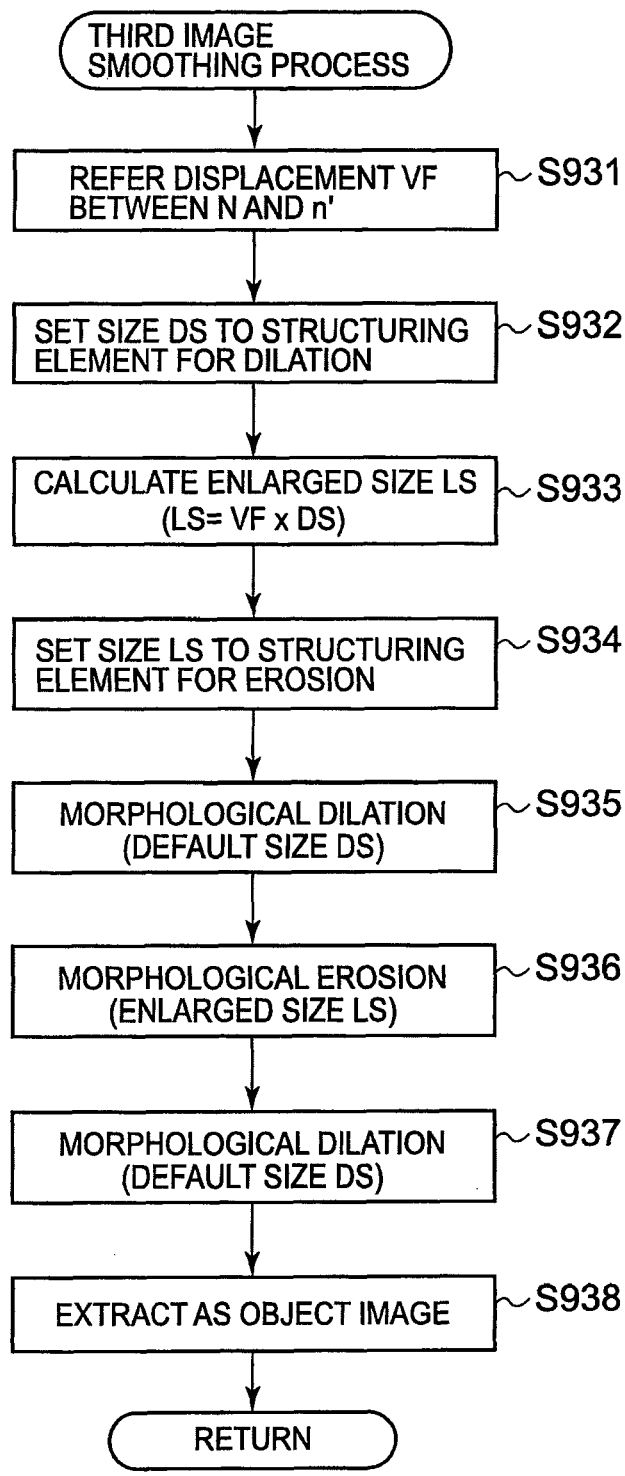
FIG. 24 is a flowchart for explaining a "third image smoothing process" according to a third embodiment of the present invention.

In the embodiment, an explanation will be given of an example case in which an unnecessary part is eliminated through such a method. A "third image smoothing process" executed in this case will be explained with reference to the flowchart of FIG. 24.

As the process starts, like the "first image smoothing process" in the first embodiment, the object detecting unit 214 accesses the "frame information table" (FIG. 7) created in the main memory device (memory) of the control unit 210, and refers to information on a displacement VF between a frame n' which is an extraction target frame for an object image and the reference frame N (step S931).

In the embodiment, like each of the foregoing embodiments, the amount of process of morphological operation is changed in accordance with the displacement VF between frames to effectively eliminate an unnecessary part. In this case, according to the embodiment, by changing the effect of morphological operation, i.e., the amount of erosion or dilation, the amount of process for smoothing of an image is changed.

In the third image smoothing process, like each of the foregoing embodiments, operation is performed in the order of morphological dilation, morphological erosion, and morphological dilation. In order to enhance a tendency of eliminating a minute difference, a target having the amount of process to be changed is set to be morphological erosion. That is, the amount of image shrinkage by one morphological erosion is increased.

In order to execute such a process, in the embodiment, the size of a structuring element used for morphological dilation (hereinafter, "structuring element SEd") and that of a structuring element used for morphological erosion (hereinafter, "structuring element SEe") differ from each other.

Because morphological dilation is set to have a normal process amount, the size of the structuring element SEd is set to be a default size thereof (hereinafter, "size DS"). In this case, the object detecting unit 214 sets the size DS as the size of the structuring element SEd to an operator defining the operation content of morphological dilation (step S932).

Conversely, because the amount of process of morphological erosion is changed in accordance with the displacement VF, the object detecting unit 214 calculates the size of the structuring element SEe based on the displacement VF referred at the step S931 (step S933). In the embodiment, by multiplying the default size DS of the structuring element by the displacement VF, an enlarged size (hereinafter, "enlarged size LS" or "size LS") of the structuring element is calculated (LS=VF×DS).

The object detecting unit 214 sets the size LS as the size of the structuring element SEe to the operator defining the content of morphological erosion (step S934). For example, the size LS is represented by a positive number, and the larger the set value is, the larger the size of the structuring element becomes. That is, the larger the displacement VF between frames is, the larger the size of the structuring element used for a predetermined morphological operation becomes.

As the size of the structuring element is set to the operator for each operation, the object detecting unit 214 performs operation in the order of "morphological dilation, morphological erosion, and morphological dilation" based on such an operator (step S935, step S936, and step S937).

In this case, because the size of the structuring element SEe used for morphological erosion is the size LS which is acquired by enlarging the size DS set for the structuring element SEd used for morphological dilation in accordance with the displacement VF, image erosion is carried out with a larger level than the dilation amount at the time of carrying out morphological dilation.

As such a morphological operation completes, the object detecting unit 214 extracts a smoothed object area as a final object image (step S938), and terminates the process (return to the flow of the "object image extracting process" (FIG. 18)).

In the "third image smoothing process", the enlarged size LS is calculated by multiplying the default size (size DS) of the structuring element used for a morphological operation by the displacement VF, it is possible to increase the amount of process (the amount of dilation or erosion) of the morphological operation in proportion to the displacement between frames. Accordingly, it is possible to further effectively eliminate an unnecessary part generated because of occlusion.

In the embodiment, as an example of the morphological operation, an operation is carried out in the order of "morphological dilation, morphological erosion, and morphological dilation". However, an operation carried out in the order of "morphological erosion, morphological dilation, and morphological erosion" may be added.

That is, even if either one of "Opening" (execution order: dilation; erosion; and dilation) or "Closing" (execution order: erosion; dilation; and erosion) is set to the operator, it is possible to effectively eliminate an unnecessary part generated because of occlusion by changing the amount of process (the size of structuring element) in accordance with the displacement VF.

In this case, it is optional to which time morphological erosion the amount of process (the changed size of structuring element) for morphological erosion is applied. For example, the size of structuring element used for all morphological erosion may be set large. Moreover, the structuring element having a larger size than morphological dilation may be used for morphological erosion carried out only when "Opening" is set.

In the embodiment, the amount of process of morphological erosion is increased (the size of structuring element is enlarged) in order to enhance a tendency of eliminating a minute difference. However, an unnecessary part can be also effectively eliminated by increasing the amount of process of morphological dilation (enlarging the size of structuring element). That is, the target having the amount of process to be changed based on the displacement between frames can be both morphological erosion and morphological dilation.

As explained above, as the present invention is applied in accordance with the foregoing embodiments, an effect that a background phase varies because of occlusion can be suppressed in the smoothing process at the time of generating a flash image, thereby suppressing any duplication of the background part.

That is, when an image with a background having a deep depth is generated by continuous image-pickup, if a displacement between frames caused because of a slight movement of the camera at the time of image pickup is large, a difference in the background part becomes large because of occlusion, and such a background part may be falsely recognized as a moving object. Accordingly, when the displacement between frames is large, for example, the area which is falsely recognized as the moving object can be eliminated by increasing, for example, the amount of process of the smoothing process through a morphological operation.

Conversely, when the displacement between frames is small, a comprehensive workload is reduced by not increasing the amount of process of the smoothing process, and even if the area of a moving object is small, a flash image can be generated without erasing such an area.

That is, the larger the displacement is, the more the amount of process for smoothing is increased, resulting in an effective generation of a flash image. As changeover of the amount of process for such a smoothing process is carried out based on a comparison of the detected displacement with a threshold, the process becomes efficient.

Alternatively, as the number of execution times of the process for smoothing can be changed by multiplying the displacement with a coefficient, or as the amount of process for smoothing can be changed by multiplying the default size of a structuring element with a displacement, it is possible to generate a good flash image more effectively.

Alignment is carried out in such a way that the background part in picked-up images becomes substantially constant, but when the displacement between frames is too large to carry out alignment, such a frame is excluded from a synthesis target for a flash image, so that it is possible to suppress any generation of a flash image having an overlapped background because of the effect of occlusion.

Moreover, if an image pickup device having a camera-shake compensation function is used, a displacement between frames can be acquired from a detection value of a sensor for camera-shake compensation, so that a process of calculating the displacement between frames can be reduced, thereby generating a flash image faster.

The foregoing embodiments are merely examples, and the present invention is not limited to the foregoing embodiments. For example, in the foregoing embodiments, a picked-up image is converted into one-dimensional data to execute the process in order to detect an object or a background in a flash image. However, how to detect an object or a background is optional, and is not limited to the above-explained example.

Moreover, in the foregoing embodiments, as a criterion for selecting an effective frame, a condition that an object does not overlap is set. However, a condition to be a criterion for selecting an effective frame is optional, and is not limited to the above-explained example.

Furthermore, in the foregoing embodiments, a displacement between a reference frame and a following each frame is detected in executing the image smoothing process, it is optional that which frame is selected as a frame for acquiring the displacement. For example, a displacement between adjoining frames can be acquired.

How to acquire the displacement is also optional, and any schemes which allow acquisition of a value that allows a determination of whether or not a frame is likely to be affected by occlusion can be employed.

In the third embodiment, the amount of process of the process for smoothing is changed by changing the size of a structuring element, factors other than the size can be changed if it results in generation a difference in the effect of the smoothing. For example, if a difference in the shapes of the structuring elements affects the effect of the smoothing, the shape of a structuring element to be applied can be changed based on a displacement between frames.

When the present invention is embodied with an image pickup device like the digital camera 1 exemplified in the foregoing embodiments, an image pickup device having the configuration of the present invention and the functions thereof beforehand can be produced, but an existing image pickup device can be used as the image pickup device of the present invention by applying a program which realizes the same function as each function of the control unit 210 to such an image pickup device.

Although the explanation has been given of the digital still camera as an example of the image pickup device in the foregoing embodiments, the form of the image pickup device is optional. For example, the present invention can be applied to a single-unit digital still camera, and can be applied to various electronic devices (e.g., a mobile phone) having the same image-pickup function.

In the foregoing embodiment, the explanation has been given of an example case in which a flash image is generated from images acquired by continuous-image-pickup by a digital still camera. However, a flash image can be generated from motion picture data because it is ok if a frame image having an object continuously changed is acquired. Therefore, a flash image can be generated at fast if the present invention is applied to various image pickup devices having a motion picture acquiring function like a video camera.

The present invention is not limited to image pickup devices if a plurality of continuous images in which images of a moving object are picked up can be acquired, and it is possible to generate a flash image that the effect of occlusion is reduced by executing the foregoing process using various devices (e.g., a personal computer) which can execute an image processing.

In such a case, by applying the program which realizes the function of the present invention, an existing device can function as the image pickup device of the present invention.

How to apply such a program is optional, for example, such a program can be applied through a memory medium, such as a CD-ROM or a memory card, storing the program, and the program can be also applied through a communication medium like the Internet.

If a device which can execute an image processing and to which the foregoing program is applied is used, generation of a flash image at a fast speed can be realized. That is, the present invention is not limited to the image pickup devices, and for example, if the foregoing program is applied to a personal computer or the like, a flash image can be generated at a fast speed from images picked up beforehand.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image pickup device comprising:
   an image pickup unit which generates a plurality of continuously picked-up images by image pickup;
   an object extracting unit which extracts a plurality of images each representing a moving object part from individual picked-up images generated by the image pickup unit;
   a background image generating unit which generates a background image from the plurality of picked-up images generated by the image pickup unit;
   a flash image generating unit which synthesizes the background image generated by the background image generating unit with the plurality of images each representing the object part extracted by the object extracting unit to generate a flash image;
   a displacement detecting unit which detects a displacement between predetermined images among the plurality of picked-up images; and
   an image smoothing unit which performs smoothing of an extracted image representing the moving object part by a process amount in accordance with the displacement detected by the displacement detecting unit;
   wherein the image smoothing unit changes the process amount of smoothing based on a value acquired by multiplying the displacement detected by the displacement detecting unit by a coefficient.

2. The image pickup device according to claim 1, wherein the larger the displacement detected by the displacement detecting unit is, the more the image smoothing unit increases the process amount of smoothing.

3. The image pickup device according to claim 1, wherein the image smoothing unit performs smoothing through a morphological operation, and the image smoothing unit changes the process amount of smoothing by changing a structuring element used for the morphological operation based on the displacement detected by the displacement detecting unit.

4. The image pickup device according to claim 3, wherein the image smoothing unit changes a size of the structuring element based on the displacement.

5. The image pickup device according to claim 1, wherein the displacement detecting unit acquires the displacement when the picked-up images are aligned with one another, and the image pickup device further comprises an image selecting unit which excludes, when the displacement detected by the displacement detecting unit is larger than or equal to a predetermined threshold, an image having the detected displacement from being a candidate of synthesis by the flash image generating unit.

6. The image pickup device according to claim 1, further comprising a sensor unit which detects a movement of the image pickup device, wherein the displacement detecting unit detects a displacement between frames based on a detection result acquired by the sensor unit.

7. A method of generating a flash image from a plurality of continuous images in which images of a moving object are picked up using a device which executes an image processing, the method comprising:
   extracting a plurality of images each representing the moving object part from the plurality of continuous images;
   generating a background image from the plurality of continuous images;

detecting a displacement between predetermined images among the plurality of continuous images;

smoothing an extracted image by a process amount in accordance with the detected displacement; and synthesizing the generated background image with the plurality of extracted images each representing the object part to generate the flash image;

wherein the process amount of the smoothing is changed based on a value acquired by multiplying the detected displacement by a coefficient.

8. A non-transitory computer-readable storage medium storing a program thereon which controls a computer to perform functions comprising:

acquiring a plurality of continuous images in which images of a moving object are picked up;

extracting a plurality of images each representing a moving object part from the plurality of continuous images;

generating a background image from the plurality of continuous images;

detecting a displacement between predetermined images among the plurality of continuous images;

performing smoothing of an extracted image by a process amount in accordance with the detected displacement; and synthesizing the generated background image with the plurality of images each representing the object part to generate a flash image;

wherein the process amount of the smoothing is changed based on a value acquired by multiplying the detected displacement by a coefficient.

* * * * *